(12) United States Patent
Iwamura et al.

(10) Patent No.: US 7,934,065 B2
(45) Date of Patent: *Apr. 26, 2011

(54) COMPUTER SYSTEM STORING DATA ON MULTIPLE STORAGE SYSTEMS

(75) Inventors: Takashige Iwamura, Yokohama (JP); Yoshihiro Asaka, Odawara (JP); Hiroshi Arakawa, Sagamihara (JP); Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/826,486

(22) Filed: Jun. 29, 2010

(65) Prior Publication Data

US 2010/0281229 A1 Nov. 4, 2010

Related U.S. Application Data

(63) Continuation of application No. 12/412,755, filed on Mar. 27, 2009, now Pat. No. 7,765,370, which is a continuation of application No. 11/022,241, filed on Feb. 16, 2005, now Pat. No. 7,512,755.

(30) Foreign Application Priority Data

Oct. 14, 2004 (JP) .................................. 2004-299835

(51) Int. Cl.
*G06F 12/00* (2006.01)

(52) U.S. Cl. ............ 711/161; 711/4; 711/100; 711/112; 711/114; 711/115; 711/162; 707/610; 707/640; 707/649; 707/655; 707/656; 707/658; 707/661; 707/662

(58) Field of Classification Search .............. 711/4, 100, 711/114, 161–162, 112, 115; 707/610, 640, 707/649, 655, 656, 658, 661, 662

See application file for complete search history.

(56) References Cited

U.S. PATENT DOCUMENTS

| | | | |
|---|---|---|---|
| 5,937,414 A * | 8/1999 | Souder et al. | 707/616 |
| 6,282,610 B1 | 8/2001 | Bergsten | |
| 6,694,447 B1 | 2/2004 | Leach et al. | |
| 6,745,303 B2 * | 6/2004 | Watanabe | 711/161 |
| 7,065,589 B2 * | 6/2006 | Yamagami | 709/246 |
| 7,134,044 B2 | 11/2006 | Day et al. | |
| 7,188,222 B2 | 3/2007 | Micka et al. | |
| 7,266,665 B2 * | 9/2007 | Stanley et al. | 711/173 |
| 7,512,755 B2 * | 3/2009 | Iwamura et al. | 711/161 |

(Continued)

FOREIGN PATENT DOCUMENTS

JP 2003-122509 A 4/2003

(Continued)

*Primary Examiner* — Tuan V Thai
*Assistant Examiner* — Zhuo H Li
(74) *Attorney, Agent, or Firm* — Kilpatrick Townsend & Stockton LLP

(57) ABSTRACT

During the normal operation state of a computer system 1000, the data stored in a primary storage system 200P is copied to an intermediate storage system 200I via synchronous copying and the data stored in the intermediate storage system 200I is copied to a secondary storage system 200R via asynchronous copying. During the reverse operation state, however, the data stored in the secondary storage system 200R is copied to the intermediate storage system 200I via asynchronous copying and the data stored in the intermediate storage system 200I is copied to the primary storage system 200P via synchronous copying. In this way, practical remote copying can be carried out in a computer system in which three or more storage devices are installed at different locations and connected serially.

19 Claims, 24 Drawing Sheets

U.S. PATENT DOCUMENTS

| | | |
|---|---|---|
| 7,765,370 B2 * | 7/2010 | Iwamura et al. ............. 711/161 |
| 2002/0016827 A1 | 2/2002 | McCabe et al. |
| 2003/0014432 A1 | 1/2003 | Teloh et al. |
| 2003/0046602 A1 | 3/2003 | Hino et al. |
| 2003/0051111 A1 * | 3/2003 | Nakano et al. ............. 711/162 |
| 2003/0088746 A1 | 5/2003 | Hino et al. |
| 2003/0105936 A1 | 6/2003 | Stakutis et al. |
| 2003/0126107 A1 | 7/2003 | Yamagami |
| 2003/0126387 A1 | 7/2003 | Watanabe |
| 2003/0177321 A1 | 9/2003 | Watanabe |
| 2004/0024975 A1 | 2/2004 | Morishita et al. |
| 2004/0034808 A1 | 2/2004 | Day et al. |
| 2004/0103164 A1 | 5/2004 | Tabuchi et al. |
| 2005/0027892 A1 | 2/2005 | McCabe et al. |
| 2006/0123212 A1 | 6/2006 | Yagawa |

FOREIGN PATENT DOCUMENTS

| | | |
|---|---|---|
| JP | 2003-167683 A | 6/2003 |

* cited by examiner

PAIR STATE TRANSITIONS IN SYNCHRONOUS COPY PAIR

PAIR STATE TRANSITIONS IN ASYNCHRONOUS COPY PAIR

COMPUTER SYSTEM STORING DATA ON MULTIPLE STORAGE SYSTEMS

CROSS-REFERENCE TO RELATED APPLICATION(S)

This application is a continuation of U.S. patent application Ser. No. 12/412,755, filed Mar. 27, 2009, which application claims priority from U.S. patent application Ser. No. 11/022,241, filed Feb. 16, 2005 (now U.S. Pat. No. 7,512, 755), and Japanese Application P2004-299835 filed on Oct. 14, 2004, the entire disclosures of all of which are incorporated herein by reference.

BACKGROUND OF THE INVENTION

The present invention relates to a technology to perform remote copying of data between storage devices in a computer system having multiple storage devices.

In a computer system that executes important operational processes such as money deposit and withdrawal at financial institutions, in order to maintain operations even in the event of a failure, strong demand exists for improvements in fault tolerance and availability. At present, a technology called 'remote copying' is often used in order to improve fault tolerance and availability. Remote copying is a technology for copying data between multiple storage devices installed at different locations, such as in different sites. According to this remote copying, even if a copy source storage device fails due to a natural disaster or the like, work processing can be continued using the copy destination storage device.

There are two substantially different forms of remote copying: synchronous copying and asynchronous copying. In synchronous copying, when a data update instruction is issued from a host computer, the completion of the update operation is reported to the host computer only after data updating has been completed on both the copy source storage device and the copy destination storage device. In other words, in synchronous copying, the two sets of data are synchronized at the same moment that the data update operation is completed, excluding the time during which the data is transmitted over the communication path and the very short amount of time required for the data to be written to the copy destination storage device. Because synchronous copying requires as short a response time from the copy destination storage device as possible, it is preferred that it be carried out between two storage devices located in adjacent areas no more than 100 km apart.

Conversely, in asynchronous copying, when a data update instruction is issued from a host computer, the completion of the update operation is reported to the host computer after updating of the data on the copy source storage device has been completed, regardless of whether updating of the data on the copy destination storage device has been completed. In other words, the update completion report can be reported to the host computer from the copy source storage device before the data received from the host computer is transmitted to the copy destination storage device. Consequently, the updated data is asynchronously copied. sequentially to the copy destination storage device in accordance with a timing scheme determined by the copy source storage device. In other words, asynchronous copying cannot guarantee that the data on the copy source storage device and the copy destination storage device will be identical at any given point in time, but it does offer the advantage of releasing the host computer from the data update operation quickly. Therefore, asynchronous copying can be used without any particular restriction on the distance between the two storage devices.

Disclosures of this type of remote copying include, for example, Japanese Patent Laid-Open No. 2003-122509, which discloses a remote copying technology wherein synchronous copying is carried out from a first storage subsystem to a nearby second storage subsystem, and asynchronous copying is carried out from the first storage subsystem to a third storage subsystem which is located far away from the first storage subsystem. Japanese Patent Laid-Open No. 2003-305856 discloses a technology whereby data is copied via asynchronous copying between two data centers.

SUMMARY

In the conventional art, there has been inadequate consideration of a technology that carries out remote copying in a computer system comprising three or more storage devices installed at different locations and connected in a serial fashion. Accordingly, there is need to carry out remote copying in a practical fashion both during normal operating conditions and after a failure has occurred.

Therefore, the computer system of one embodiment of the present invention is a computer system storing date on multiple storage systems, the computer system comprising:

a primary storage system that is connected to a first computer that executes prescribed work processing and stores data used when the first computer is executing the work processing;

a secondary storage system that is connected to a second computer that executes the work processing in place of the first computer and stores data used when the second computer is executing the work processing;

an intermediate storage system that is connected to the primary and secondary storage systems and stores received data;

a first remote copy means that causes the primary storage system to copy the data stored therein into the intermediate storage system via synchronous copying for storage therein and the intermediate storage system to copy the copied data to the secondary storage system via asynchronous copying for storage therein, as executing the work processing by the first computer; and a second remote copy means that causes the secondary storage system ultimately to copy the data stored therein into the primary storage system via asynchronous copying for storage therein, as executing the work processing by the second computer.

In the computer system, where work processing is being executed using the first computer, the data is copied synchronously from the primary storage system to the intermediate storage system, and is then copied asynchronously from the intermediate storage system to the secondary storage system. As a result, the distance from the intermediate storage system to the secondary storage system can be made longer than the distance from the primary storage system to the intermediate storage system. Using such a construction, even where a failure occurs in the primary and intermediate storage systems due to a relatively large-scale natural disaster, for example, work processing can be quickly resumed by using the data that has already been copied to the secondary storage system.

In addition, in the computer system, when the primary storage system recovers after work processing is resumed using the second computer and the secondary storage system, data is copied from the secondary storage system to the primary storage system via asynchronous copying. Therefore, in the event of a subsequent failure in the second computer and the secondary storage system, work processing can be quickly resumed by the first computer by using the data copied to the primary storage system as described above.

In the computer system having the above construction, it is acceptable if, where the second computer is executing work processing, the secondary storage system copies the data stored therein to the intermediate storage system via asynchronous copying for storage therein, and the intermediate storage system synchronously copies the data stored therein to the primary storage system for storage therein, such that the data stored in the secondary storage system is ultimately copied to and stored in the primary storage system.

Using this construction, data can be copied from the secondary storage system to the primary storage system via the intermediate storage system without the need for a communication circuit that directly connects the two storage systems. As a result, the cost of system construction can be reduced.

In the computer system having the above construction, it is acceptable if second remote copy means includes a first means that inhibits the secondary storage system from copying to the intermediate storage system while copying from the intermediate storage system to the primary storage system is occurring, and a second means that inhibits the intermediate storage system from copying to the primary storage system while copying from the secondary storage system to the intermediate storage system is occurring.

Using this construction, because data is not copied from the secondary storage system to the intermediate storage system before synchronous copying from the intermediate storage system to the primary storage system is completed, the occurrence of data inconsistency between the intermediate storage system and the primary storage system can be minimized.

In the computer system, it is acceptable if
(i) the intermediate storage system comprises a primary intermediate storage system connected to the primary storage system and a secondary intermediate storage system connected to the secondary storage system,
(ii) the first remote copy means causes the primary storage system to copy the data stored therein into the primary intermediate storage system via synchronous copying for storage therein and the primary intermediate storage system to copy the copied data to the secondary storage system via asynchronous copying for storage therein, as executing the work processing by the first computer; and
(iii) the second remote copy means causes the secondary storage system to copy the data stored therein into the secondary intermediate storage system via synchronous copying for storage therein and the secondary intermediate storage system to copy the copied data stored therein to the primary storage system via asynchronous copying for storage therein, as executing the work processing by the second computer.

Using this construction, where work processing is being executed by the second computer, data can be backed up to the secondary intermediate storage system via synchronous copying, in the same manner as when work processing is being carried out by the first computer. As a result, because the most recent data is stored in the secondary intermediate storage system even in the event of a failure in the secondary storage system, work processing can be quickly resumed using this most recent data.

In the computer system having the above construction, it is acceptable if the primary storage system, the primary intermediate storage system, the secondary intermediate storage system, and the secondary storage system are configured to receive data:
the primary intermediate storage system comprises a switching device that is connected to the common communication line, determines the recipient of the data receiving via the common communication line, and where the recipient of the data is the primary intermediate storage system, inputs the data to the primary intermediate storage system.

It is furthermore acceptable if the primary storage system, the primary intermediate storage system, the secondary intermediate storage system, and the secondary storage system are configured to receive a data:
the secondary intermediate storage system comprises a switching device that is connected to the common communication line, determines the recipient of the data receiving via the common communication line, and where the recipient is the secondary intermediate storage system, inputs the data to the secondary intermediate storage system.

Using this construction, because the primary intermediate storage system or secondary intermediate storage system need not determine the recipient of data on its own, the processing burden can be reduced.

In the above computer system, it is acceptable if, it further comprises a back-up means that causes the secondary storage system to copy the data stored therein to the secondary intermediate storage system via asynchronous copying for storage therein while the first remote copy means copies the data stored in the primary storage system to the secondary storage system through the intermediate storage system.

Using this construction, because the data can be preserved using the secondary intermediate storage system even where work processing is being carried out using the first computer, system reliability can be improved. Moreover, by using the data stored in the secondary intermediate storage system, the data can be quickly copied to the primary storage system when the operability of the primary storage system has been restored.

In the computer system, it is acceptable if the intermediate storage system comprises a primary intermediate storage system connected to the primary storage system and a secondary intermediate storage system connected to the primary intermediate storage system and to the secondary storage system,
the first remote copy means causes (i) the primary storage system to copy the data stored therein into the primary intermediate storage system via synchronous copying for storage therein, (ii) the primary intermediate storage system to copy the copied data to the secondary intermediate storage system via asynchronous copying for storage therein, and (iii)
the secondary intermediate storage system to copy the copied data to the secondary storage system via asynchronous copying for storage therein, and the second remote copy means causes (iv) the secondary storage system to copy the data stored therein into the secondary intermediate storage system via synchronous copying for storage therein, (v) the secondary intermediate storage system to copy the copied data to the primary intermediate storage system via asynchronous copying for storage therein, and (vi) the primary intermediate storage system to copy the copied data to the primary storage system via asynchronous copying for storage therein.

Using this construction, regardless of whether work processing is being carried out by the first computer or the second computer, system operation based on an identical copy scheme can be achieved simply by reversing the direction of data copy. This allows copy control processing to be simplified.

In the various aspects of the computer system described above, it is furthermore acceptable if the second computer includes a fail-over unit that, where at least one of the first computer and the primary storage system is in a non-operating state, copies to the secondary storage system all of the data that is stored in the intermediate storage system but has not yet been copied to the secondary storage system for storage therein.

Using this construction, because the most recent data can be copied to the secondary storage system at the moment that a failure occurs in the primary host computer or the primary storage system, work processing can be quickly resumed using the second computer.

In the computer system having the above construction, it is acceptable if the second computer includes a data loss information notification unit that, before starting the work processing by the second computer, notifies the administrator regarding whether or not data loss has occurred, based on whether or not the copying of the data by the fail-over unit was completed normally.

Using this construction, the administrator can determine whether or not work processing should be resumed using the second computer based on whether or not data loss has occurred. The data loss information notification unit may display whether or not data loss has occurred on a display device, or may provide notification through a voice message. It may also output such notification to a printing apparatus.

The present invention may be realized in various forms other than the various computer system constructions described above, such as in the form of a data copy control method in a computer system having multiple storage systems, a computer program to execute data copy control in a computer system having multiple storage devices, a recording medium on which such computer program is recorded, or data signals that include this computer program and are encoded in a carrier wave.

DESCRIPTION OF THE PREFERRED EMBODIMENTS

Figure 1:
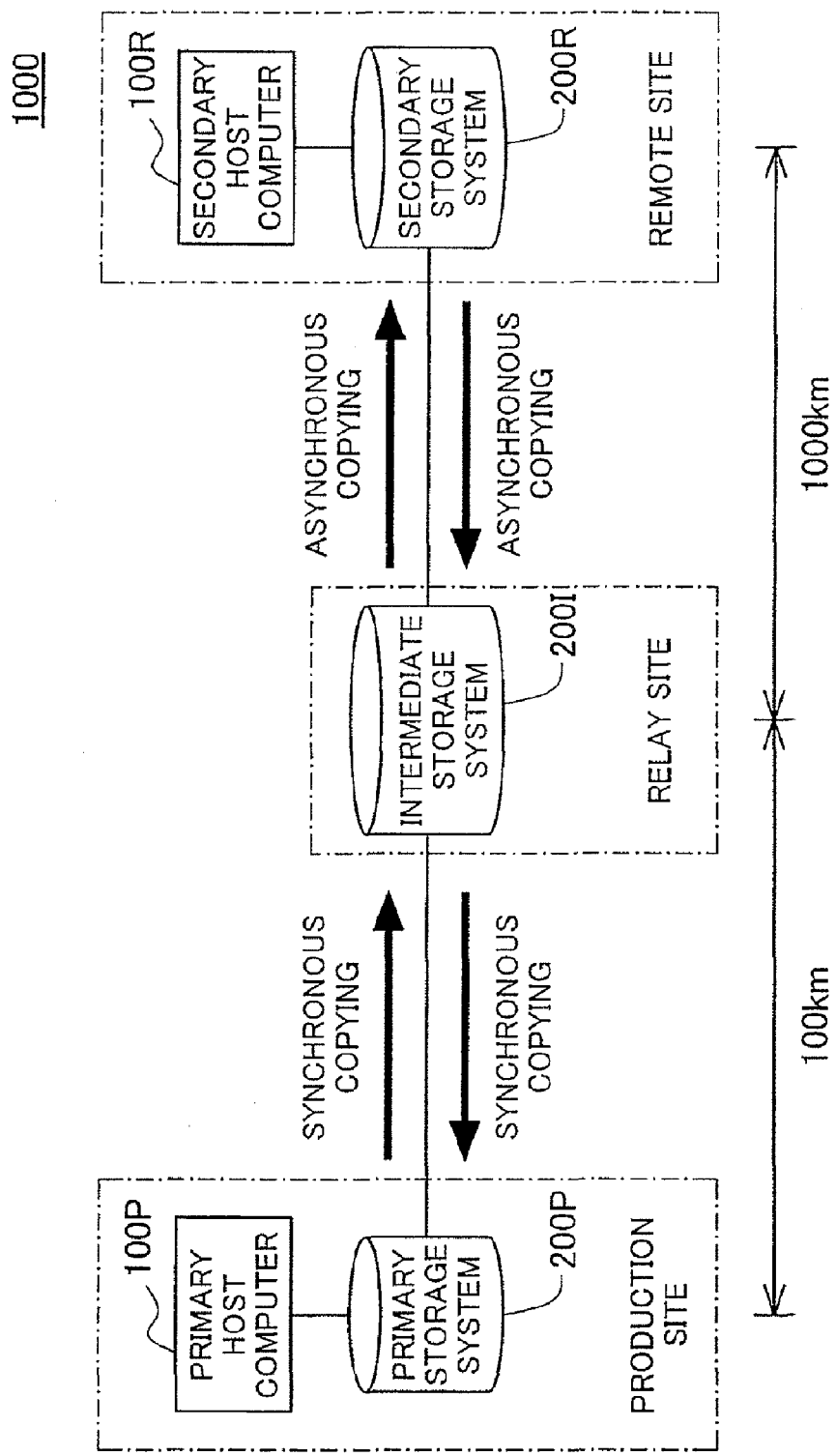
FIG. 1 is an explanatory drawing showing the basic construction of a computer system 1000 comprising a first embodiment.

In order to further clarify the operation and effect of the present invention described above, embodiments of the present invention will be described in the following sequence.
A. First embodiment
  (A1) Construction of computer system
  (A2) Initial copying routine
  (A3) Failover routine
  (A4) Reverse copying routine
  (A5) Reverse copy control routine
  (A6) Failback routine
B. Second embodiment
C. Third embodiment
D. Fourth embodiment A. First Embodiment (A1) Construction of Computing System FIG. 1 is an explanatory drawing showing the detailed construction of a computer system 1000 comprising a first embodiment. The computer system 1000 comprises a primary host computer 100P that is used to execute a prescribed work application, a secondary host computer 100R that is used to execute the work application in place of the primary host computer 100P where, for example, a failure occurs in the primary host computer 100P, a primary storage system 200P that stores data used when the primary host computer 100P is executing the work application, a secondary storage system 200R that stores data used when the secondary host computer 100R is executing the work application, and an intermediate storage system 200I that is connected to both the primary storage system 200P and the secondary storage system 200R. In this way, the three storage devices, i.e., the primary storage system 200P, the intermediate storage system 200I and the secondary storage system 200R, are connected in a serial fashion.

The primary host computer 100P and primary storage system 200P are installed at a production site comprising the main location at which the work processing is performed, while the intermediate storage system 200I is installed at a nearby intermediate site that is located approximately 100 km from the production site. In this embodiment, remote copying takes place between the primary storage system 200P and the intermediate storage system 200I via synchronous copying that is compatible with the copying of data to a nearby location. At the same time, the secondary host computer 100R and secondary storage system 200R are installed at a distant remote site that is located approximately 1000 km from the intermediate site. In this embodiment, remote copying takes place between the intermediate storage system 200I and the secondary storage system 200R via asynchronous copying that is compatible with the copying of data to a distant location.

In the description below, the direction from the primary storage system 200P to the intermediate storage system 200I and from the intermediate storage system 200I to the secondary storage system 200R is termed the 'forward direction'. Conversely, the direction from the secondary storage system 200R to the intermediate storage system 200I and from the intermediate storage system 200I to the primary storage system 200P is termed the 'reverse direction'. In addition, the combination of the copy source and copy destination when remote copying is carried out between storage devices is called a 'copy pair', or simply a 'pair'. A pair between which synchronous copying is carried out is called a 'synchronous copy pair', while a pair between which asynchronous copying is carried out is called an 'asynchronous copy pair'.

Figure 2:
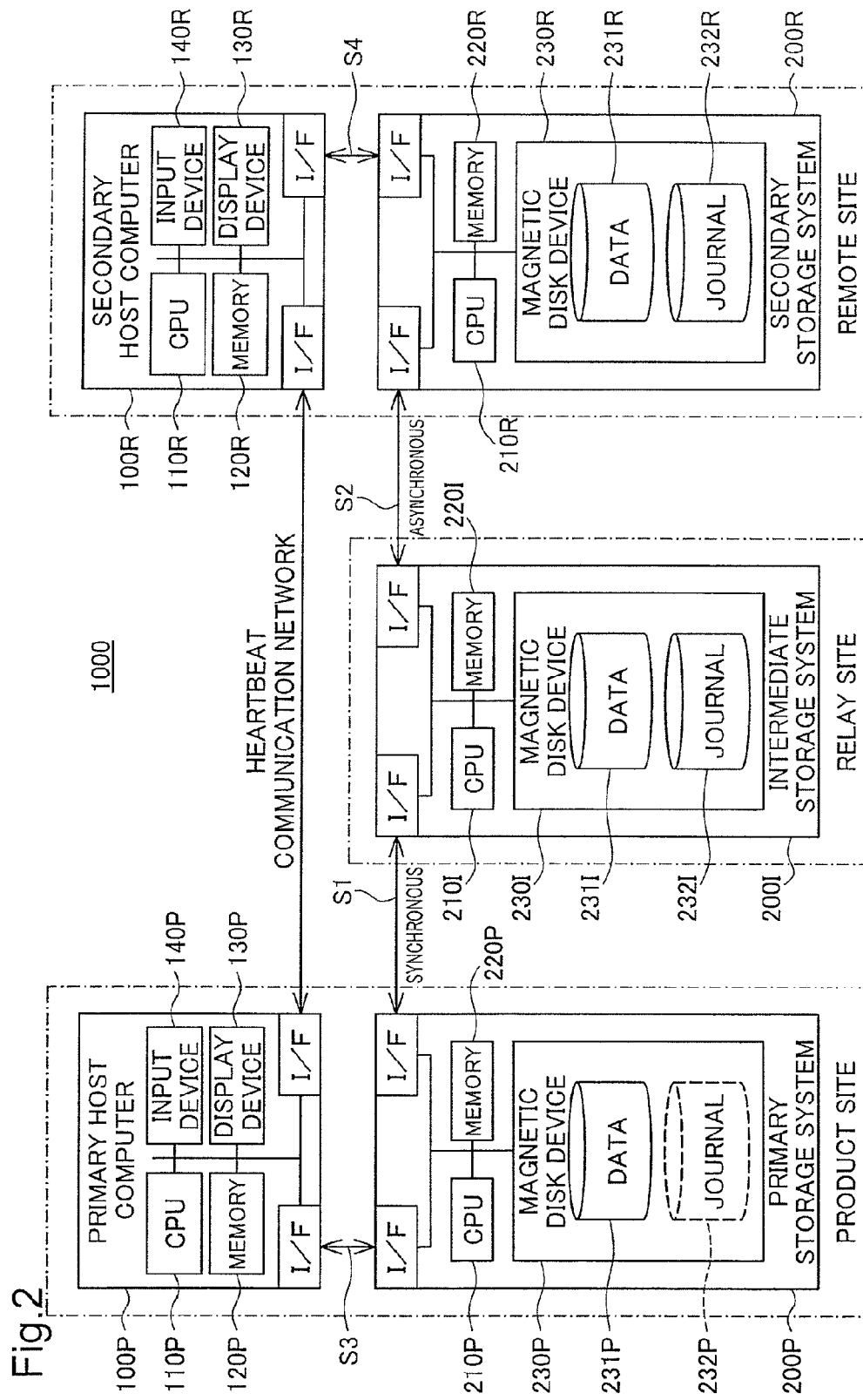
FIG. 2 is an explanatory drawing showing the detailed construction of the computer system 1000.

FIG. 2 is an explanatory drawing showing the detailed construction of the computer system 1000. The primary host computer 100P and the primary storage system 200P are connected by a prescribed communication line S3, and the secondary host computer 100R and the secondary storage system 200R are connected by a prescribed communication line S4. The primary storage system 200P and intermediate storage system 200I, and the intermediate storage system 200I and secondary storage system 200R, are respectively connected over communication circuits S1 and S2 comprising an IP network or fiber channel.

The primary host computer 100P and the secondary host computer 100R are general-use computers that each include a CPU 110, a memory 120, a display device 130 such as a CRT, an input device 140 such as a keyboard and the like. The primary host computer 100P and the secondary host computer 100R are connected to each other over a communication network (such as the Internet) that carries out heartbeat communication. When processing is carried out normally, the two host computers mutually send and receive prescribed signals on a periodic basis as heartbeat communications. Where there is a break in the signals from the other side, the signal-receiving host computer determines that a failure may have occurred in the other host computer or in the storage device connected directly thereto. In this case, the system administrator directly checks the status of the production site to determine whether the system has been damaged by a natural disaster. In addition, it is acceptable if (i) a monitoring host computer (not shown) is installed on the same network as client computers (not shown) to which the primary host computer 100P provides work processing services, (ii) heartbeat communications take place between this monitoring host computer and the primary host computer 100P, and (iii) where these heartbeat communications are interrupted for a fixed period of time, it is determined that damage has occurred at the production site.

The CPU 110P of the primary host computer 100P executes a work application and a copy control program stored in the memory 120P. The work application is a program that carries out various work processing such as money deposit/withdrawal processing using data stored in the primary storage system 200P. On the other hand, the copy control program is a program that manages the remote copying carried out between the various storage devices, and performs such routines as the (1) initial copying routine, (2) failover routine, (3) reverse copying routine, (4) reverse copy control routine and (5) failback routine described below. Programs identical to these programs are stored in the memory 120R of the secondary host computer 100R, such that the secondary host computer 100R can execute the same routines executed by the primary host computer 100P.

Because the primary storage system 200P, intermediate storage system 200I and secondary storage system 200R have the identical hardware construction, only the primary storage system 200P will be described below. The primary storage system 200P includes multiple interfaces (I/F) to implement the transmission and receipt of data between the host computer and other storage devices, as well as multiple magnetic disk devices 230P to store the data copied from these devices. It also includes a CPU 210P and a memory 220P to control the reading and writing of data to and from these multiple magnetic disk devices 230P. Multiple logical volumes (a logical volume may be referred to below as 'LVOL') may be incorporated in these multiple magnetic disk devices 230P. A first remote copy means and a second remote copy means are realized by the operations of the CPU 210P and the CPU 210I respectively.

A data volume 231P that stores data and a journal volume 232P that stores log information indicating the update history of the data volume 231P are maintained in the storage area of a magnetic disk 230P. It is acceptable that the primary storage system comprises a storage medium like memory, non-volatile cache memory, or other kind of storage medium, and the log information is stored in such storage medium. These volumes are logical volumes, and may be maintained in one magnetic disk device or across multiple magnetic disk devices. The log information includes update data (write data) received from the host computer, as well as a timestamp indicating the date and time of updating and a sequential number indicating the sequential position of the update. With asynchronous copying, the data on the copy destination storage device is updated when this log information is sent from the copy source storage device to the copy destination storage device. In asynchronous copying, because the communication path between the copy destination and the copy source may be long and multiple such paths may exist, and the communication delay may vary for each communication path, the update data does not necessarily reach the copy destination storage device in the order of updating. However, because the log information includes a sequential number indicating the sequential position of the update data, the copy destination storage device can update its own data while ensuring data synchronization with the copy source data by updating the data in this numerical sequence. In this embodiment, the journal volume 232P of the primary storage system is not essential and may be omitted.

Definition information indicating the type of remote copying to be performed by the primary storage system 200P is set by the primary host computer 100P or the secondary host computer 100R and stored in the memory 220P of the primary storage system 200P. This definition information defines, for example, the ID number for the LVOL of a copy source belonging to a copy pair, the ID name of the copy destination storage device and the ID number for the copy destination LVOL, the copy direction between the pair, the copy type that indicates whether remote copying between the pair is to be carried out via synchronous copying or asynchronous copying, and the like. The CPU 210P carries out remote copying of the data stored in the magnetic disk devices 230P based on this definition information. In addition to information set by the host computer, the CPU 210 records in this definition information state information indicating the copy pair state (pair state).

Figure 3:
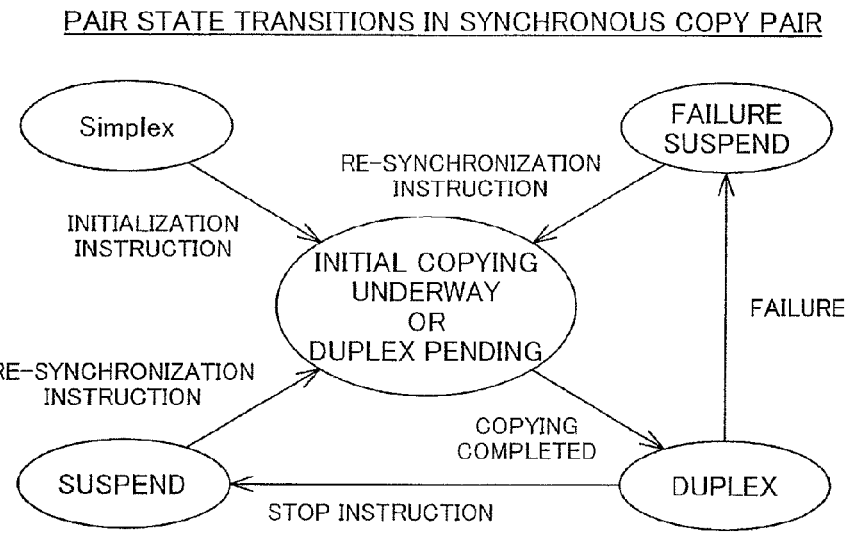
FIG. 3 is an explanatory drawing showing the possible pair states of a synchronous copy pair and the transitions therebetween.

FIG. 3 is an explanatory drawing showing the possible pair states of a synchronous copy pair and the transitions therebetween. Each pair state shown in the drawing will be described in detail below.

Simplex State

The 'simplex' state is a state in which a copy pair is formed but copying between the copy source LVOL and the copy destination LVOL has not yet begun.

Duplex State

The 'duplex' state is a state in which synchronous remote copying has begun, initialization copying described below has been completed, and the data contents have been synchronized between the copy source LVOL and the copy destination LVOL that form the copy pair. In the case of synchronous remote copying, after the contents that have been written to the copy source LVOL have been copied to the copy destination LVOL, a message indicating normal completion is returned to the host computer that performed the writing. Therefore, excluding the area in which writing is taking place, the copy source LVOL data is synchronized with the copy destination LVOL.

Initial Copying Underway

'Initial copying underway' is an interim state during transition from the simplex state to the duplex state. During this period, initialization copying is carried out from the copy source LVOL to the copy destination LVOL if necessary during this state. Initialization copying is copying of the data already stored in the copy source LVOL to the copy destination LVOL. Once initialization copying is completed and processing necessary to implement the transition to the duplex state is completed, the pair state becomes the duplex state.

Suspend State

The 'suspend' state is a state in which the contents written to the copy source LVOL are not reflected in the copy destination LVOL. In other words, in this state, different data is contained in the copy source LVOL and the copy destination LVOL that form the copy pair. A copy pair in a different pair state transitions to this suspend state based on an instruction from the operator or the host computer. When the copy source storage device receives write data from the host computer after the suspend state becomes active, it sends a completion report to the host computer at the moment that the write data is stored in its own cache memory, without sending this data to the copy destination LVOL. In addition, when the copy source storage device receives write data from the host computer during this suspend state, it stores the write position for that write data in its LVOL as difference bitmap data or the like.

Failure Suspend

'Failure suspend' is a state resulting from an automatic transition to a suspend state that occurs when a failure occurs in the communication circuit between the copy source LVOL and the copy destination LVOL, the magnetic disk devices, the CPU, the memory or the like.

Duplex Pending

'Duplex pending' is an interim state during transition from the suspend state or the failure suspend state to the duplex state. In this state, data is copied from the copy source LVOL to the copy destination LVOL in order to synchronize the data contents between the two LVOLs. Once this copying is completed and the data in the copy destination LVOL is identical to the data in the copy source LVOL, the pair state enters the duplex state. Copying during this duplex pending state is carried out via differences-only copying in which only the portion of the data required for updating (i.e., the portion of the data that is different between the copy source LVOL and the copy destination LVOL) is copied, using the data write position (for example, the difference bitmap described above) stored in the copy source LVOL storage device during the suspend state.

Figure 4:
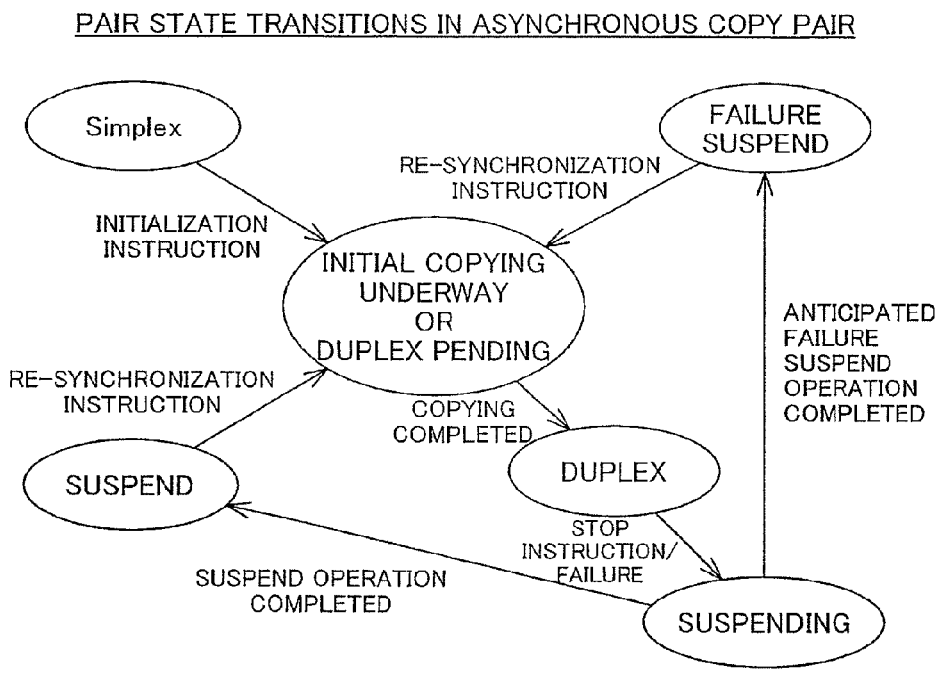
FIG. 4 is an explanatory drawing showing the possible pair states of an asynchronous copy pair and the transitions therebetween.

FIG. 4 is an explanatory drawing showing the possible pair states of an asynchronous copy pair and the transitions therebetween. The 'simplex' state, 'initial copying underway', 'suspend' state, 'failure pending' state and 'duplex pending' state are identical for an asynchronous copy pair and a synchronous copy pair, so only the differences will be described below.

Duplex State

The 'duplex' state is basically the same as that for a synchronous copy pair, but because copying of the write data to the copy destination LVOL is performed asynchronously, updating of the data contents of the copy destination LVOL occurs slightly after updating of the data contents of the copy source LVOL.

Suspending State

The 'suspending' state is an interim state that exists during transition from the duplex state to the suspend state (comprising the failure suspend state). In other words, in the case of asynchronous remote copying, the copy state transitions to the suspend state via the suspending state. As in the case of synchronous remote copying, the copy source storage device stores, regarding the data received after the commencement of the suspending state, the position in which such data is to be written, but in the case of asynchronous remote copying, a log is also recorded pertaining to the write data that was received by the copy source storage device prior to the advent of the suspending state but that could not be copied to the copy source destination device prior thereto.

(A2) Initial Copying Routine

The various routines executed in the computer system 1000 having the above construction will now be described. First, the initial copying routine executed by the primary host computer 100P in order to transition the computer system 1000 to the normal operation state will be described. This initial copying routine is executed on the primary host computer 100P by the administrator via prescribed operations.

Figure 5:
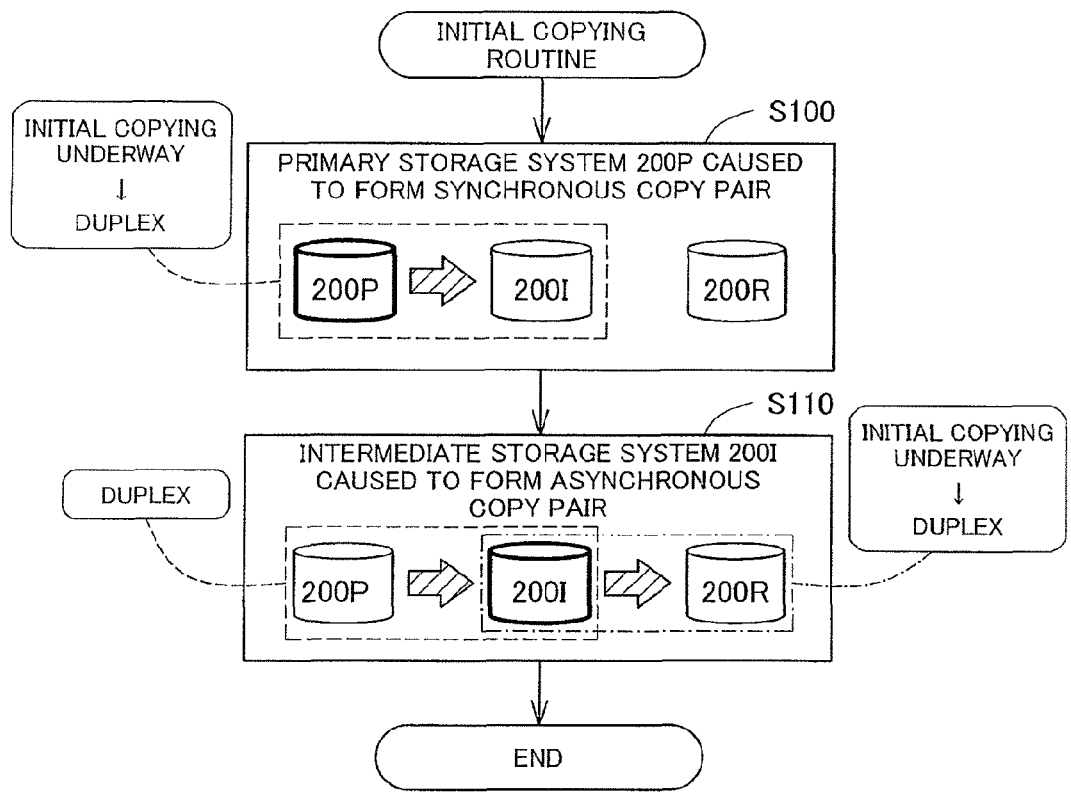
FIG. 5 is a flow chart of an initial copying routine in the first embodiment.

FIG. 5 is a flow chart of the initial copying routine. In the drawing, the storage device indicated in bold lines is the target of control. A group of storage devices surrounded by a dashed line is a synchronous copy pair, and a group of storage devices surrounded by a chain-dot line is an asynchronous copy pair. The arrow direction indicates the direction of copying, and an arrow marked with hatch lines indicates that the copy pair at either end thereof is in the 'duplex', 'initial copying' or 'duplex pending' state. An arrow that does not contain hatch lines indicates that the pair at either end thereof is in the 'suspend' state. In the drawing, the transitions to the pair state entered by each copy pair are also displayed.

First, the primary host computer 100P issues an instruction to the primary storage system 200P to cause it to form a synchronous copy pair that carries out synchronous copying in the forward direction from the primary storage system 200P to the intermediate storage system 200I (step S100). In response to this instruction, the primary storage system 200P configures the copy source LVOL, the copy destination storage device and the copy destination LVOL in the definition information in the memory 220P. In accordance with this definition information, the data in the data volume 231P is copied to the intermediate storage system 200I via formation copying. The intermediate storage system 200I then stores the received data in its own data volume 231I. When formation copying is begun, the pair state of the synchronous copy pair becomes 'initial copying underway', and when formation copying is completed, the pair state of this synchronous copy pair transitions to the 'duplex' state. Here, 'formation copying' is a generic term for initialization copying, differential copying and full copying in which all of the data stored in the copy source is copied to the copy destination.

The primary host computer 100P then forms an asynchronous copy pair to carry out asynchronous copying in the forward direction from the intermediate storage system 200I to the secondary storage system 200R by issuing an instruction to the intermediate storage system 200I via the primary storage system 200P (step S110). In response to this instruction, the intermediate storage system 200I configures the copy source LVOL, the copy destination storage system and the copy destination LVOL in the definition information in the memory 220I. Based on this definition information, the data stored in the data volume 232I is copied to the secondary storage system 200R via formation copying. The secondary storage system 200R stores the data received from the intermediate storage system 200I in the data volume 231R. When formation copying is begun, the pair state of the asynchronous copy pair becomes 'initial copying underway', and when formation copying is completed, the pair state transitions to the 'duplex' state.

When the primary host computer 100P executes a work application after the initial copying routine described above is completed, the data in the primary storage system 200P updated by this work application is automatically synchronously copied to the intermediate storage system 200I and the updated contents are then asynchronously copied to the secondary storage system 200R. As a result, even if a failure occurs in the primary host computer 100P or the primary storage system 200P, because the data is backed up in the intermediate storage system 200I and the secondary storage system 200R, work processing can be quickly resumed using this backup data.

When the initial copying routine described above is completed, the synchronous copy pair formed by the primary storage system 200P and the intermediate storage system 200I and the asynchronous copy pair formed by the intermediate storage system 200I and the secondary storage system 200R both enter the duplex state. When an asynchronous copy pair is in the duplex state, asynchronous remote copying is executed using the journal volume. Specifically, the intermediate storage system 200I stores in the data volume 231I the data received from the primary storage system 200P via synchronous remote copying, creates log information, and stores the log information in the journal volume 232I. The intermediate storage system 200I then copies the log information stored in the journal volume 232I to the secondary storage system 200R via asynchronous remote copying. When the secondary storage system 200R receives this log information, it updates its own data volume 231R based on this log information and stores the updated contents in the journal volume 232R as log information.

(A3) Failover Routine

The failover routine executed by the secondary host computer 100R when a failure occurs in the primary host computer 100P will now be described. This failover routine is a routine to update the data stored in the secondary storage system 200R to the most recent data as of the moment of failure before the secondary host computer 100R executes the work application on behalf of the primary host computer 100P.

Figure 6:
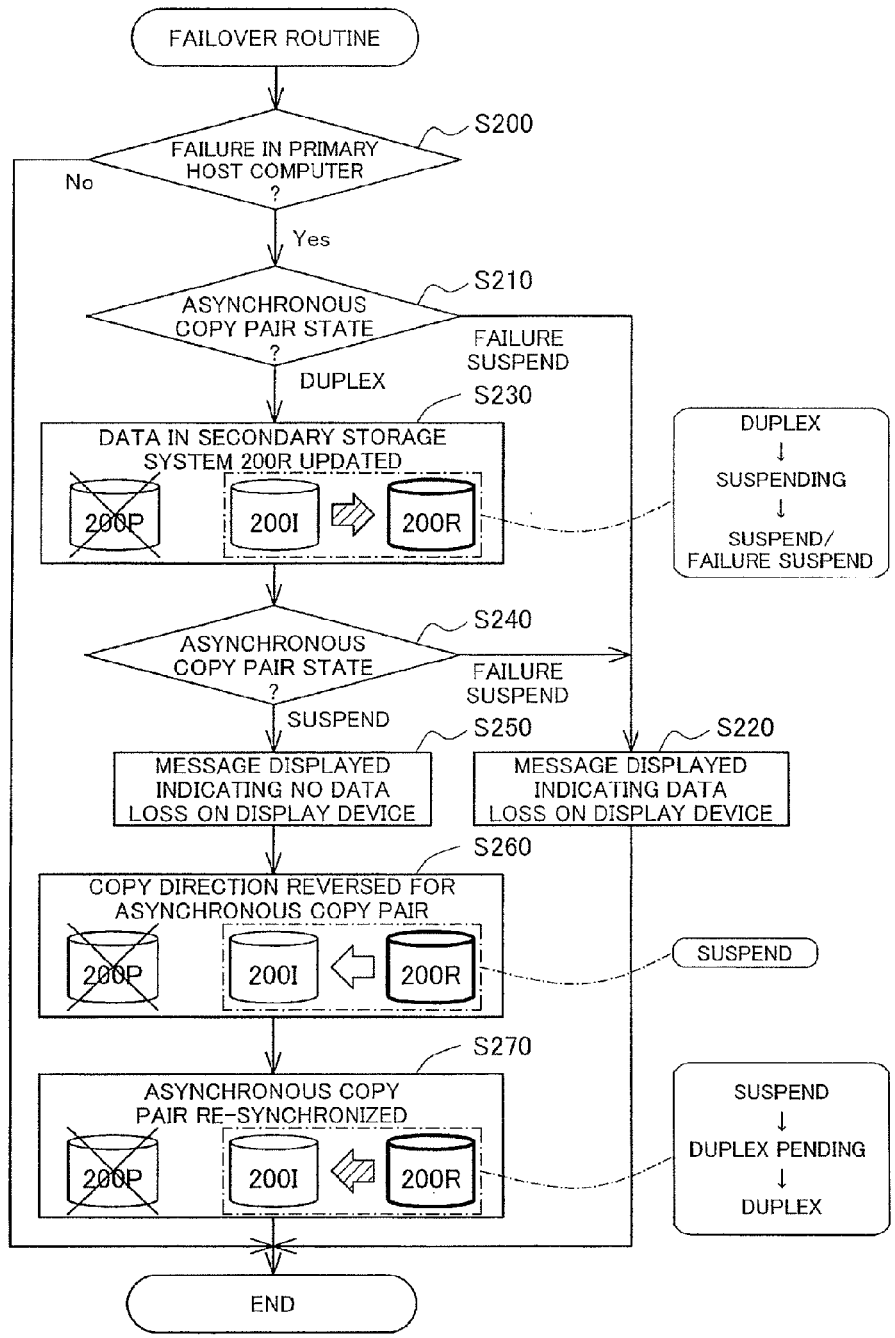
FIG. 6 is a flow chart of a failover routine in the first embodiment.

FIG. 6 is a flow chart of the failover routine. First, when the secondary host computer 100R detects via heartbeat communication that a failure has occurred in the primary host computer 100P or the primary storage system 200P (YES in step S200), it requests from the secondary storage system 200R state information regarding the asynchronous copy pair formed by the intermediate storage system 200I and the secondary storage system 200R (step S210). If the pair state of this asynchronous copy pair is 'failure suspend', the intermediate storage system 200I may have suffered a failure as well, which would mean that there are possibilities that the most recent data cannot be copied from the intermediate storage system 200I to the secondary storage system 200R. Consequently, a message indicating that the data stored in the secondary storage system 200R is not the most recent data, i.e., that data loss has occurred, is displayed on the display device 130R of the secondary host computer 100R (step S220), whereupon the failover routine ends. Here, a message indicating that data loss has occurred is displayed on the display device 130R, but it is acceptable if the administrator is notified via a voice message or via a printout from a printing apparatus.

In step S210 described above, if the state of the asynchronous copy pair is 'duplex', the secondary host computer 100R causes the secondary storage system 200R to retrieve all log information stored in the journal volume 232U of the intermediate storage system 200I and update the data (step S230). Based on this instruction from the second host computer 100R, the intermediate storage system 200I and the secondary storage device 200R set the pair state of the asynchronous copy pair formed by the data volume 231I and the data volume 231R to 'suspending', and the log information stored in the journal volume 232I of the intermediate storage system 200I is sent from the intermediate storage system 200I to the secondary storage system 200R. Where data updating is completed normally based on the received log information, the secondary storage system 200R sets the pair state of the asynchronous pair to 'suspend' and records it as state information in the memory 220R. On the other hand, where data updating was not completed normally, the secondary storage system 200R sets the pair state of the asynchronous copy pair to 'failure suspend'.

Next, the secondary host computer 100R once more asks the secondary storage system 200R for state information regarding the asynchronous copy pair (step S240). If the resulting state information is 'failure suspend', because it can be determined that updating of the secondary storage system 200R was not completed normally based on the log information, the CPU 110R advances to the processing of step S220, displays on the display device 130R a message indicating that data loss occurred (step S220), and ends the failover routine.

If the response to the inquiry of step S240 described above is 'suspend', because it can be determined that the data in the secondary storage system 200R was updated normally, the secondary host computer 100R displays on the display device 130R a message indicating that data loss did not occur, i.e., that no data loss occurred (step S250).

After the message indicating no data loss is displayed, the secondary host computer 100R issues an instruction to the secondary storage system 200R to reverse the asynchronous copy pair copy direction from the forward direction to the reverse direction (step S260). The secondary host computer 100R then re-synchronizes the asynchronous copy pair formed by the data volume 231R of the secondary storage system 200R and the data volume 231I of the intermediate storage system 200I once more via formation copying (step S270) and ends the failover routine. The pair state of the asynchronous copy pair becomes 'duplex pending' while formation copying is taking place during step S270, and transitions to 'duplex' when formation copying is completed.

Once formation copying is completed in the above step S270, the secondary host computer 100R takes over work processing from the primary host computer 100P, and the updated data written to the secondary storage system 200R by the work application that was restarted by the secondary host computer 100R is also stored in the intermediate storage system 200I via asynchronous remote copying. In other words, the secondary storage system 200R writes the updated data received from the secondary host computer 100R to the data volume 231R, and creates log information and writes it to the journal volume 232R. The log information is then sent to the intermediate storage system 200I via asynchronous remote copying. When this log information is received, the intermediate storage system 200I updates its own data volume 231I based on the received log information. Where updated data need not be copied to the intermediate storage system 200I via asynchronous remote copying after work processing is resumed by the secondary host computer 100R, the processing of steps S260 and S270 above may be omitted.

According to the failover routine described above, where a failure occurs in the primary host computer 100P or the primary storage system 200P, the data in the secondary storage system 200R can be updated using the data stored in the intermediate storage system 200I. As a result, even if a failure occurs in the primary host computer 100P or the primary storage system 200P, the work application can be rebooted quickly using the most recent data. Furthermore, even if a failure occurs in the intermediate storage system 200I as well as in the primary host computer 100P or the primary storage system 200P, consistent data copied via asynchronous copying remains in the secondary storage system 200R, though it is not the most recent data. Consequently, even where a failure occurs in the intermediate storage system 200I, work may be resumed using consistent data.

According to the failover routine described above, because information indicating whether or not data loss has occurred is displayed on the display device 130R, the administrator can determine whether or not to reboot the work application with reference to this information. Where data loss did not occur, the work application can be rebooted in the secondary host computer 100R while the data is backed up to the intermediate storage system 200I via the reverse-direction asynchronous copy pair formed in steps S260 and S270 above.

At the same time, where data loss has occurred, the work application can be executed using only the data stored in the secondary storage system 200R. Naturally, the rebooting of the work application may be cancelled in the event of data loss.

(A4) Reverse Copying Routine

Next, the reverse operation copying routine executed by the secondary host computer 100R when all of the failures that exist in the primary host computer 100P, the primary storage system 200P and/or the intermediate storage system 200I have been cleared will be explained. This reverse operation copying routine is a routine to transition the computer system 1000 to a reverse operation state after all device failures have been cleared. The reverse operation state is an operation state in which the work application is executed using the secondary host computer 100R when all devices in the computer system 1000 are operating normally.

Figure 7:
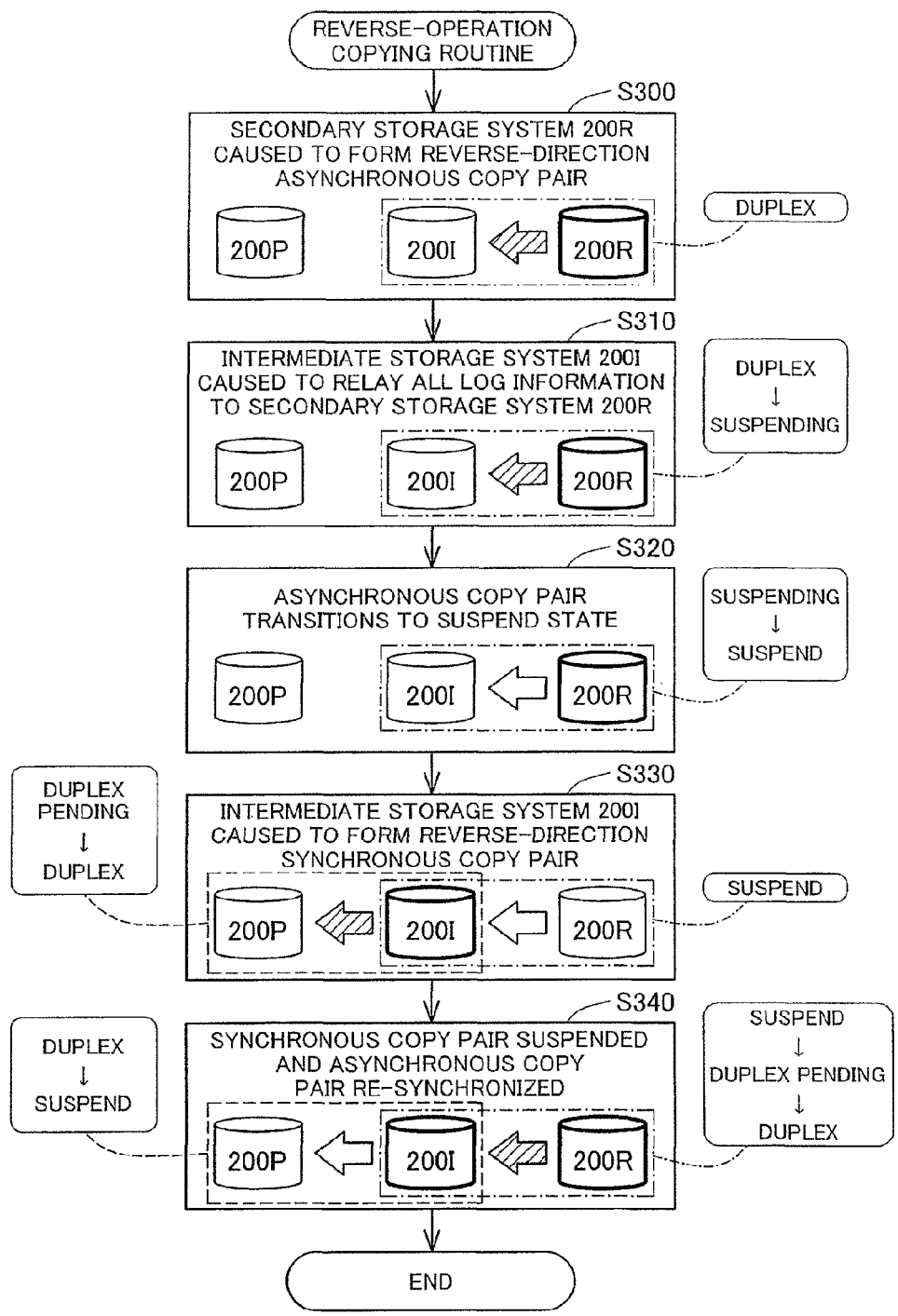
FIG. 7 is a flow chart of a reverse copying routine in the first embodiment.

FIG. 7 is a flow chart of the reverse operation copying routine. First, the secondary host computer 100R issues an instruction to the secondary storage system 200R to form an asynchronous copy pair that carries out asynchronous copying in the reverse direction, i.e., from the secondary storage system 200R to the intermediate storage system 200I, and sets the pair state to 'duplex' via formation copying (step S300). However, where a reverse-direction asynchronous copy pair already exists between these storage devices, the pair state of such pair may be synchronized once more via formation copying. Where re-synchronization has already been completed, i.e., where the failover routine shown in FIG. 6 is completed up to step S270 and the asynchronous copy pair is already in the duplex state, for example, the processing of this step S300 may be omitted.

After the asynchronous copy pair is set to the 'duplex' state, the secondary host computer 100R instructs the secondary storage system 200R to copy all of the log information accumulated in the journal volume 232R of the secondary storage system 200R to the intermediate storage system 200I (step S310). Based on this instruction, the secondary storage system 200R and the intermediate storage system 200I set the asynchronous copy pair state to 'suspending', and the secondary storage system 200R sends the log information in the journal volume 232R created based on the data sent from the secondary host computer 100R to the intermediate storage system 200I. When this log information is received, the intermediate storage system 200I updates the data stored in its own data volume 231I. When copying of the log information is completed, the asynchronous copy pair state transitions to 'suspend' (step S320).

Next, the secondary host computer 100R forms a synchronous copy pair to carry out synchronous copying in the reverse direction from the intermediate storage system 200I to the primary storage system 200P by issuing an instruction to the intermediate storage system 200I via the secondary storage system 200R, for example (step S330). Through this operation, the data stored in the intermediate storage system 200I is formation-copied to the primary storage system 200P. The pair state of this synchronous copy pair is 'initial copying' while this formation copying is underway, and transitions to 'duplex' after formation copying is completed.

Finally, the secondary host computer 100R issues an instruction to the intermediate storage system 200I to set the synchronous copy pair state to 'suspend', and issues an instruction to the secondary storage system 200R to re-synchronize the asynchronous copy pair via formation copying and set the pair state to 'duplex' (step S340).

After the reverse operation copying routine described above is executed, the data stored in the secondary storage system 200R is also stored in the intermediate storage system 200I and the primary storage system 200P, such that the operation state of the computer system 1000 can be transitioned to the reverse operation state. Specifically, the copying of data during reverse operation is controlled via the reverse operation copy control routine described below.

(A5) Reverse Operation Copy Control Routine

The reverse operation copy control routine executed at all times by the secondary host computer 100R during reverse operation of the computer system 1000 will now be explained. This reverse operation copy control routine is a routine to ultimately copy the data in the secondary storage system 200R that is updated by the work application executed by the secondary host computer 100R to the primary storage system 200P while maintaining the data's consistency.

Figure 8:
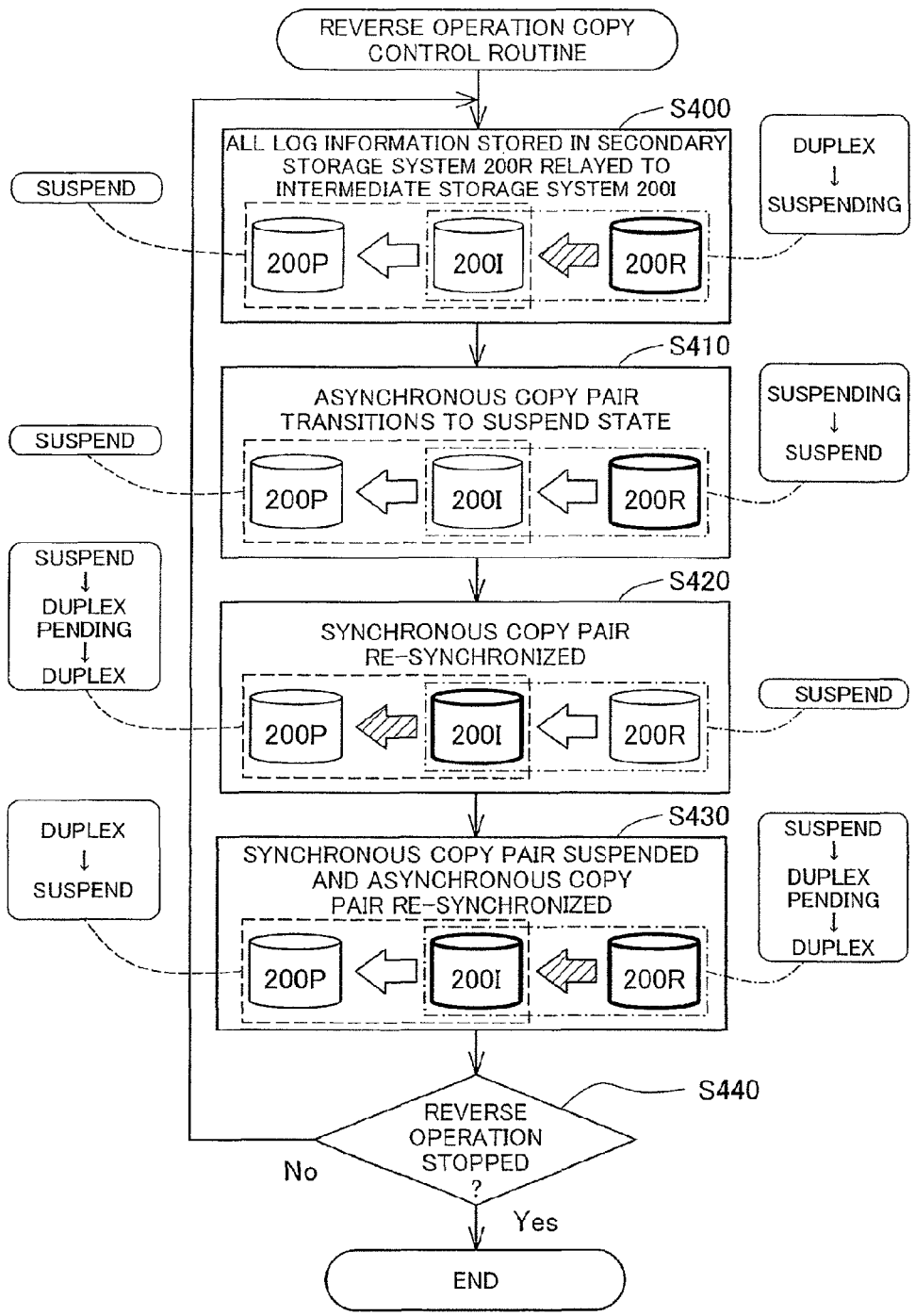
FIG. 8 is a flow chart of a reverse copy control routine in the first embodiment.

FIG. 8 is a flow chart of the reverse operation copy control routine. First, the second host computer 100R instructs the secondary storage system 200R to copy the log information accumulated in the journal volume 232R to the intermediate storage system 200I (step S400). Based on this instruction, the secondary storage system 200R and the intermediate storage system 200I set the asynchronous copy pair state to 'suspending' and the log information in the journal volume 232R created based on the data received from the secondary host computer 100R is sent by the secondary storage system 200R to the intermediate storage system 200I. When the intermediate storage system 200I receives this log information, it updates the data stored in its own data volume 231I. When the copying of the log information is completed, the pair state of the asynchronous copy pair transitions to 'suspend' (step S410).

Next, the secondary host computer 100R issues an instruction to the intermediate storage system 200I to re-synchronize the synchronous copy pair formed between the intermediate storage system 200I and the primary storage system 200P (step S420). As a result, the data stored in the intermediate storage system 200I is copied to the primary storage system 200P via synchronous copying. In this operation, the pair state of the synchronous copy pair immediately following re-synchronization becomes 'duplex pending', and transitions to 'duplex' once re-synchronization processing, comprising formation copying, is completed.

The secondary host computer 100R then issues an instruction to the intermediate storage system 200I to set the pair state of the synchronous copy pair to 'suspend', and issues an instruction to the secondary storage system 200R to re-synchronize the synchronous copy pair via formation copying (step S430). In this operation, the pair state of the synchronous copy pair immediately following re-synchronization becomes 'duplex pending', and then transitions to 'duplex' immediately after formation copying is completed.

The secondary host computer 100R repeatedly executes the series of processes described above until reverse operation is finished through a prescribed operation executed by the administrator (step S440). These repeated operations may be performed at prescribed intervals, or may be executed when a prescribed amount of log information is accumulated in the journal volume 232R of the secondary storage system 200R.

According to the reverse operation copy control routine described above, the pair state of the asynchronous copy pair becomes 'suspend' during copying between the synchronous copy pair, and the pair state of the synchronous copy pair becomes 'suspend' during copying between the asynchronous copy pair. Consequently, the data in the intermediate storage system 200I is not updated by the secondary storage system 200R, and therefore the loss of data consistency between the intermediate storage system 200I and the primary storage system 200P can be prevented.

A6) Failback Routine

Next, the failback routine that updates the data stored in the primary storage system 200P to the most recent data when the computer system 1000 operating in the reverse operation state returns to the normal operation state will be described. This failback routine is a routine that is executed by the primary host computer 100P when a prescribed instruction is issued by the administrator after the work application being executed by the secondary host computer 100R is shut down.

Figure 9:
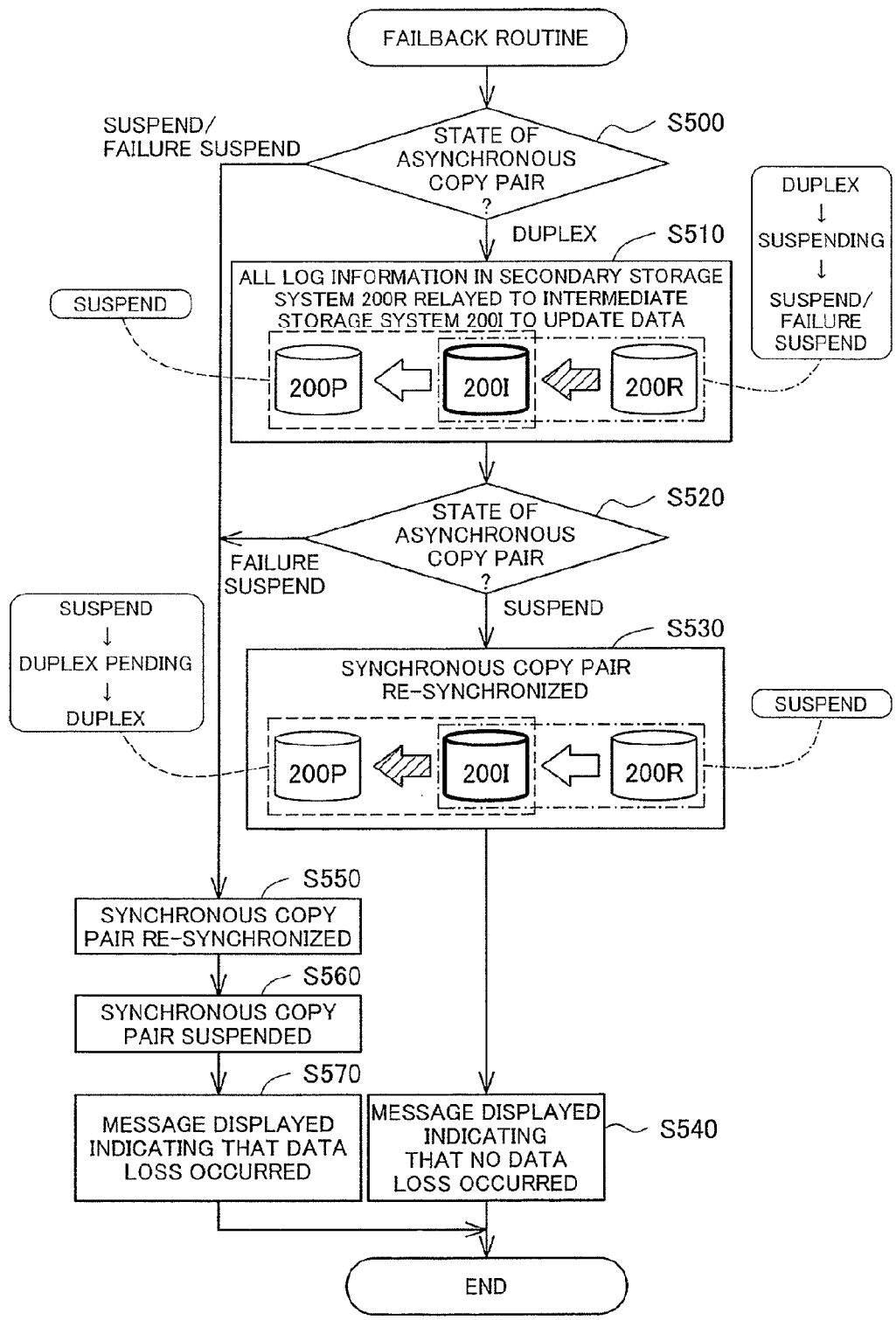
FIG. 9 is a flow chart of a failback routine in the first embodiment.

FIG. 9 is a flow chart of the failback routine. First, the primary host computer 100P asks the intermediate storage system 200I for state information regarding the asynchronous copy pair formed by the intermediate storage system 200I and the secondary storage system 200R (step S500). If communication between these storage devices is being carried out normally and the pair state is 'duplex', the primary host computer 100P instructs the intermediate storage system 200I to retrieve all log information stored in the journal volume 232R of the secondary storage system 200R and update the data (step S510). Based on this instruction from the primary host computer 100P, the intermediate storage system 200I and the secondary storage system 200R set the pair state of the asynchronous copy pair formed by the data volume 231I and the data volume 231R to 'suspending' and the log information stored in the journal volume 232R of the secondary storage system 200R is sent from the secondary storage system 200R to the intermediate storage system 200I. If the copying of the log information from the secondary storage system 200R to the intermediate storage system 200I is completed normally, the pair state of the asynchronous copy pair transitions to 'suspend'. However, if this data copying fails, the pair state of the asynchronous copy pair becomes 'failure suspend'.

The primary host computer 100P then asks the intermediate storage system 200I for state information regarding the asynchronous copy pair (step S520). If this pair state is 'suspend', the primary host computer 100P re-synchronizes the synchronous copy pair formed by the primary storage system 200P and the intermediate storage system 200I via formation copying (step S530). In this operation, the pair state of the synchronous copy pair becomes 'duplex pending' during formation copying and transitions to 'duplex' after formation copying is completed. When re-synchronization is completed, the synchronous copy pair state is set to 'suspend', enabling the storage area of the secondary storage system 200R to be read and written.

According to the above routine, the most recent data stored in the secondary storage system 200R is copied to the primary storage system 200P via the intermediate storage system 200I. As a result, the primary host computer 100P displays a 'no data loss' message on the display device 130P (step S540), and after the work application is rebooted, ends the failback routine.

Where the response to the inquiry in step S500 above seeking the state information regarding the asynchronous copy pair formed by the intermediate storage system 200I and the secondary storage system 200R is 'suspend' or 'failure suspend', i.e., something other than 'duplex', the failback based on 'no data loss' is aborted in principle. Similarly, where the response to the inquiry in step S520 is 'failure suspend', the failback based on 'no data loss' is aborted in principle. In these cases, the primary host computer 100P first re-synchronizes the synchronous copy pair via formation copying by carrying out processing identical to the processing performed in step S530 (step S550). After re-synchronization is completed, the primary host computer 100P sets the synchronous copy pair state to 'suspend' (step S560), and displays on the display device 130P a message indicating that data loss occurred (step S570).

However, where the response to the inquiry in step S500 is 'suspend', failback based on 'no data loss' can be executed by adding the following operation between the steps S500 and S510 described above. In this operation, when it is determined that the response to the inquiry is 'suspend', first, the primary host computer 100P sets the synchronous copy pair to 'suspend' after re-synchronizing them, and re-synchronizes the asynchronous copy pair via formation copying. This enables the asynchronous copy pair to be transitioned to the duplex state. Failback based on no data loss can thereafter be executed via the operations of steps S510-S540.

If the failback routine described above is completed normally, the data stored in the secondary storage system 200R during reverse operation is copied ultimately to the primary storage system 200P. As a result, the computer system 1000 is transitioned to the normal operation state via execution once more of the initial copying routine described above by the primary host computer 100P, enabling the work application to be rebooted thereon using the data stored in the primary storage system 200P.

According to the computer system 1000 of the first embodiment having the above construction, practical remote copying can be carried out in a normal operation state and a reverse operation state by implementing synchronous copying and asynchronous copying between three storage devices installed at different locations and connected serially. As a result, the fault-tolerance and availability of the system can be improved.

B. Second Embodiment

Figure 10:
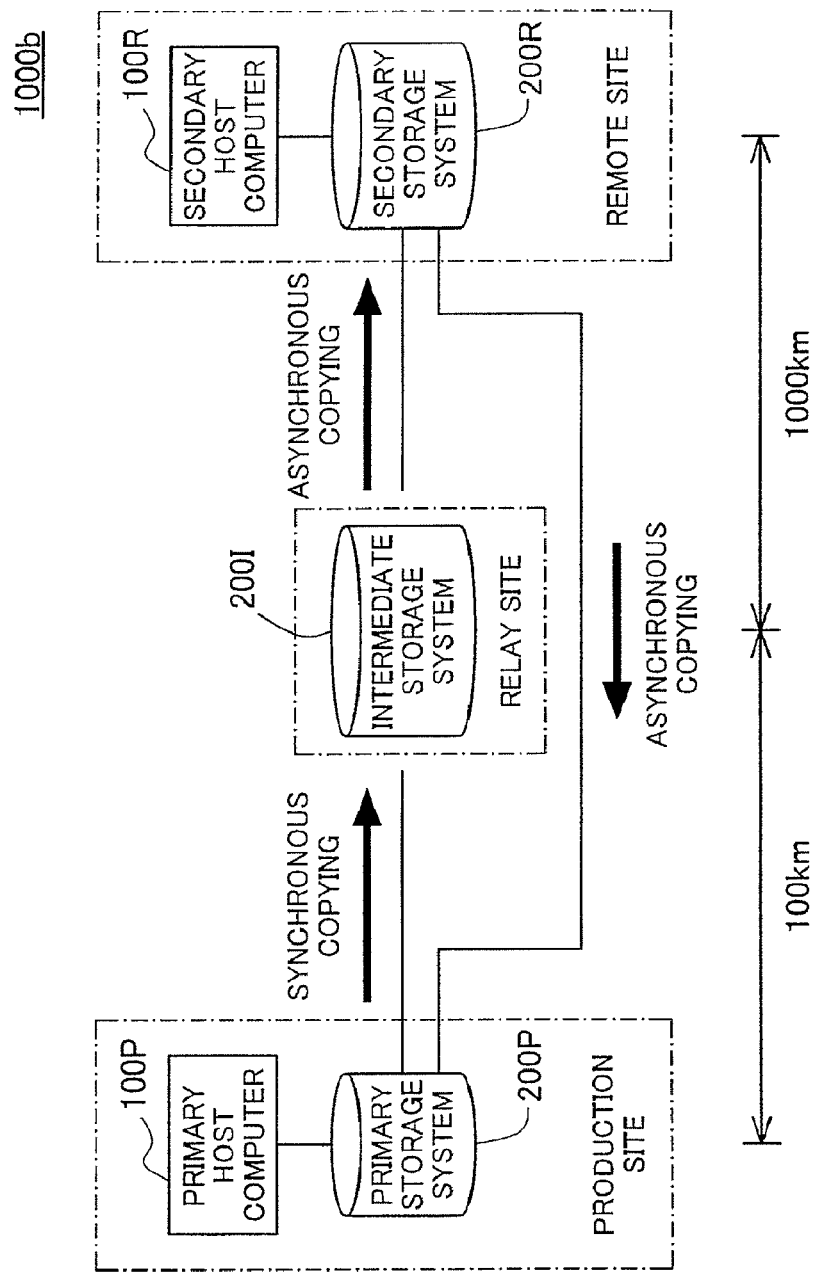
FIG. 10 is an explanatory drawing showing the basic construction of a computer system 1000b comprising a second embodiment.

FIG. 10 is an explanatory drawing showing the basic construction of a computer system 1000b comprising a second embodiment. In the computer system 1000b of this embodiment, because remote copying is carried out using the same copy schemes as in the first embodiment, the initial copying routine and the failover routine are executed in the same manner as in the first embodiment. Therefore, these routines will not be described here. However, the steps S260 and S270 of the failover routine shown in FIG. 6 may be omitted here.

On the other hand, the computer system 1000b executes remote copying in the reverse operation state directly from the secondary storage system 200R to the primary storage system 200P without going through the intermediate storage system 200I. Consequently, the reverse operation copying routine and the failback routine are executed differently than they are in the first embodiment. Therefore, these operations executed in this embodiment will be described in detail below. In this embodiment, because remote copying is not carried out between the three storage devices in the order of asynchronous copying, synchronous copying, the reverse operation copy control routine described in connection with the first embodiment is not executed here.

Figure 11:
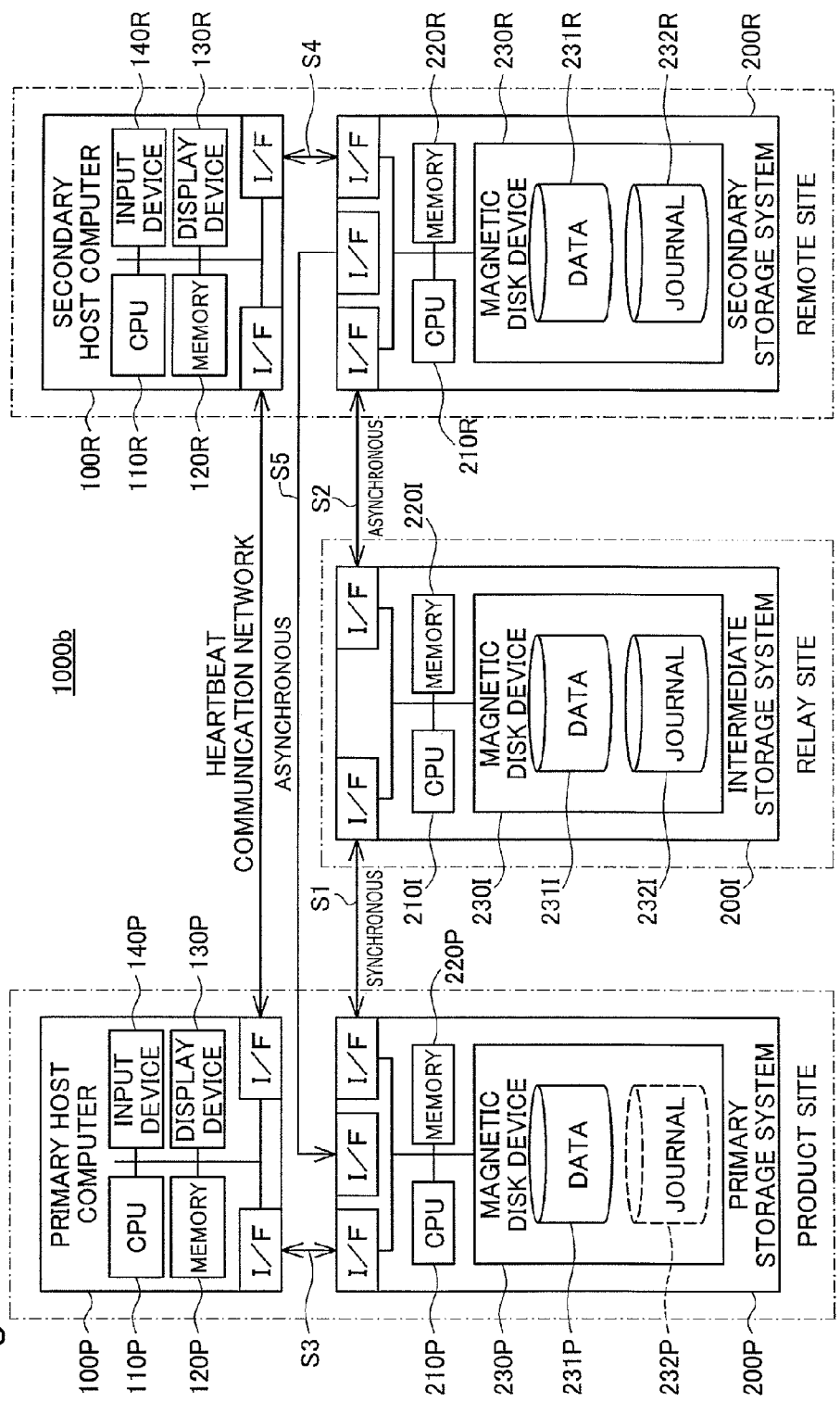
FIG. 11 is an explanatory drawing showing the detailed construction of the computer system 1000b.

FIG. 11 is an explanatory drawing showing the detailed construction of the computer system 1000b of this embodiment. As shown in the drawing, in comparison with the computer system 1000 of the first embodiment, the computer system 1000b of this embodiment includes an additional communication circuit S5 that directly connects the primary storage system 200P and the secondary storage system 200R. Furthermore, the journal volume 232P of the primary storage system 200P that was optional in the first embodiment is a required constituent component in this embodiment.

(B1) Reverse Operation Copying Routine

Figure 12:
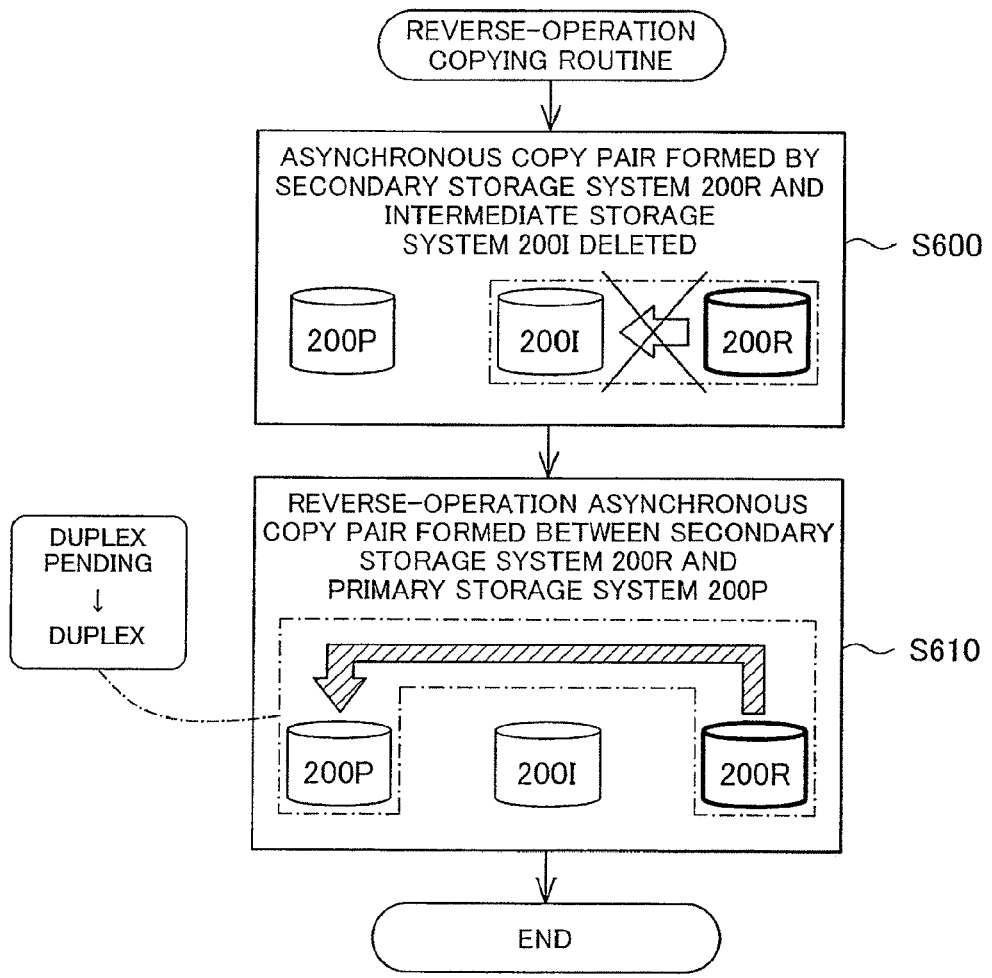
FIG. 12 is a flow chart of a reverse copying routine in the second embodiment.

FIG. 12 is a flow chart of the reverse operation copying routine of the second embodiment. This reverse operation copying routine is a routine that is executed by the secondary host computer 100R in order to transition the computer system 1000b to the reverse operation state when the failure that occurred in the primary host computer 100P and/or the primary storage system 200P is cleared.

First, where an asynchronous copy pair has already been formed by the secondary storage system 200R and the intermediate storage system 200I, the secondary host computer 100R deletes this copy pair (step S600).

The secondary host computer 100R then issues an instruction to the secondary storage system 200R that causes it to form a reverse-direction asynchronous copy pair that performs asynchronous remote copying directly from the secondary storage system 200R to the primary storage system 200P using the communication circuit S5 (step S610). When the secondary storage system 200R receives this instruction, it copies the data from the data volume 231R thereof to the data volume 231P of the primary storage system 200P via formation copying. The pair state of this asynchronous copy pair becomes 'initial copying' during data copying, and transitions to 'duplex' after copying is completed.

After the reverse-operation copying routine described above is completed, because an asynchronous copy pair is formed by the secondary storage system 200R and the primary storage system 200P, if the data in the secondary storage system 200R is updated together with the execution of the work application in the secondary host computer 100R, this updated data is automatically remote-copied directly to the primary storage system 200P.

(B2) Failback Routine

Figure 13:
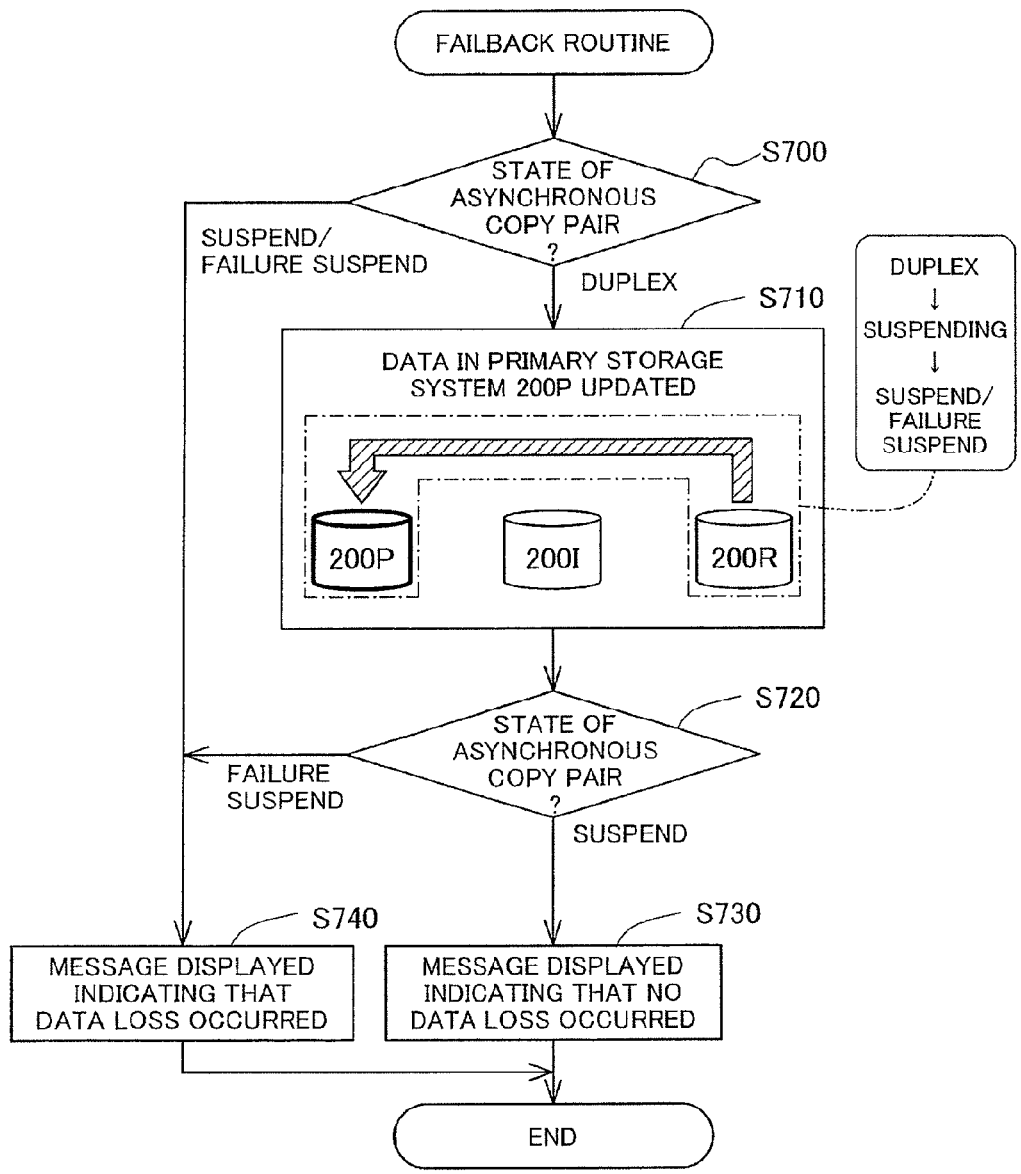
FIG. 13 is a flow chart of a failback routine in the second embodiment.

FIG. 13 is a flow chart of the failback routine of the second embodiment. This failback routine is a routine to update the data stored in the primary storage system 200P to the most recent data when the operation state of the computer system 1000b is returned from the reverse operation state to the normal operation state. This failback routine is executed after the work application being executed by the secondary host computer 100R has been shut down.

First, the primary host computer 100P asks the primary storage system 200P for state information regarding the asynchronous copy pair formed by the primary storage system 200P and the secondary storage system 200R (step S700). If the pair state of this asynchronous copy pair is 'duplex', the primary host computer 100P instructs the primary storage system 200P to retrieve all log information stored in the journal volume 232R of the secondary storage system 200R and update the data (step S710). Based on this instruction from the primary host computer 100P, the primary storage system 200P and the secondary storage system 200R set the pair state of the asynchronous copy pair to 'suspending' and the log information stored in the journal volume 232R of the secondary storage system 200R is sent from the secondary storage system 200R to the primary storage system 200P. If the copying of the log information from the secondary storage system 200R to the primary storage system 200P is completed normally, the pair state of the asynchronous copy pair transitions to 'suspend'. However, if the copying of this log information fails, the pair state of the asynchronous copy pair becomes 'failure suspend'.

The primary host computer 100P then requests state information regarding the asynchronous copy pair once more from the primary storage system 200P (step S720). If the pair state is 'suspend', the primary host computer 100P displays a message of 'no data loss' on the display device 130P (step S730) and ends the failback routine after rebooting the work application.

If the response to the inquiry of the above step S700 is that the pair state of the asynchronous copy pair is either 'suspend' or failure suspend', i.e., if the pair state is something other then 'duplex', because that means that remote copying between the primary storage system 200P and the secondary storage system 200R has been paused or stopped for some reason, the failback based on no data loss is aborted in principle, as it is when the inquiry of the above step S720 is returned with a pair state of 'failure suspend'. Consequently, a message indicating that data loss occurred is displayed on the display device 130P (step S740), whereupon the failback routine ends.

However, where the inquiry of the above step S700 returns a response of 'suspend', failback based on no data loss can also be executed by adding the following operation between the above steps S700 and 5710. In this operation, if it is determined that the response to the pair state inquiry is 'suspend', the primary host computer 100P first issues an instruction to re-synchronize the asynchronous copy pair, and formation copying from the data volume 231R to the data volume 231P is executed based on this instruction. This causes the pair state of the asynchronous copy pair to become 'duplex' when formation copying is completed. Consequently, failback based on no data loss can be performed by thereafter executing the operations that follow step S710.

Once the failback routine described above is completed, the primary host computer 100P can transition the computer system 1000b to the normal operation state by executing the initial copying routine described in connection with the first embodiment.

According to the computer system 1000b of the second embodiment having the above construction, because the synchronous copy pair formed by the primary storage system 200P and the intermediate storage system 200I need not be re-synchronized in the failback routine, the computer system 1000b can be quickly transitioned to the normal operation state.

C. Third Embodiment

Figure 14:
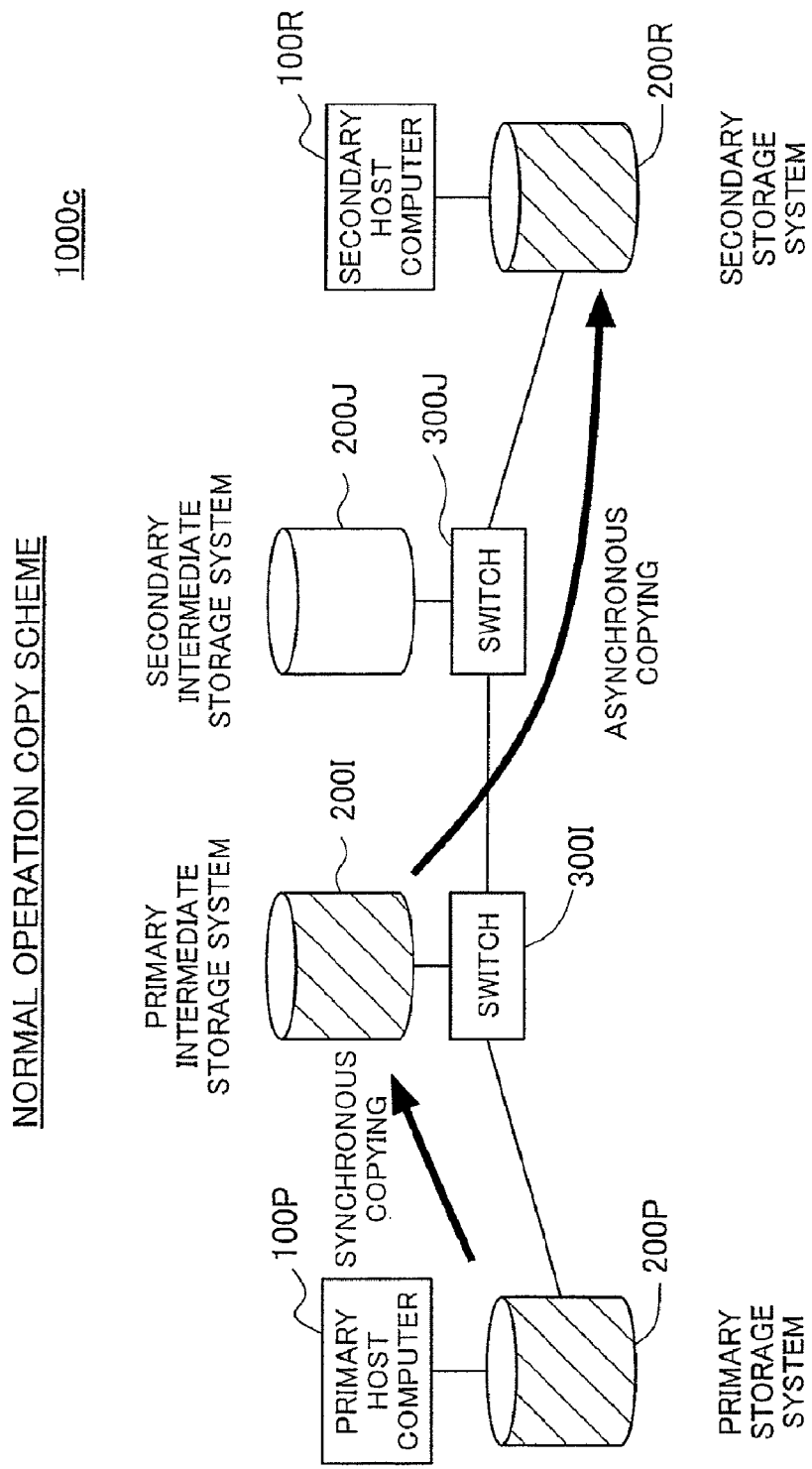
FIG. 14 is an explanatory drawing that shows the construction of a computer system 1000c comprising a third embodiment, as well as shows in a basic fashion the copy scheme employed therein during normal operation.

FIG. 14 is an explanatory drawing that shows in a schematic fashion the construction of a computer system 1000c comprising a third embodiment, as well as the copy scheme employed during normal operation. In comparison with the computer system 1000 of the first embodiment, the computer system 1000c of this embodiment includes an additional intermediate storage system that is located between the intermediate storage system 200I and the secondary storage system 200R and is serially connected thereto. Accordingly, in the description below, the intermediate storage system 200I in the first embodiment is termed the primary intermediate storage system 200I, and the additional intermediate storage system is termed the secondary intermediate storage system 200J. The secondary intermediate storage system 200J is installed at a location that is distant from the primary storage system 200P but is close to the secondary storage system 200R. There are no particular restrictions on the distance between the primary intermediate storage system 200I and the secondary intermediate storage system 200J.

In this embodiment, a first switching device 300I and second switching device 300J are respectively connected to the primary intermediate storage system 200I and secondary intermediate storage system 200J. These switching devices include a means to determine the recipient of received data and copy the data to the optimal communication circuit. For example, if the recipient of data sent from the primary storage system 200P is the primary intermediate storage system 200I, the first switching device 300I copies the data to the primary intermediate storage system 200I, while in any other case, it lets the data pass through and outputs it to a different storage device. Where switching devices are respectively connected to the intermediate storage systems in this way, because the primary and secondary storage systems need not make their own determination regarding the data recipient, the processing burden thereon can be reduced. However, these switching devices may be omitted, and the intermediate storage systems may include a component that performs the same function as these switching systems.

As shown in FIG. 14, in this embodiment, a forward-direction synchronous copy pair is formed by the primary storage system 200P and the primary intermediate storage system 200I, and a forward-direction asynchronous copy pair is formed by the primary intermediate storage system 200I and the secondary storage system 200R. In other words, because the secondary intermediate storage system 200J is not used during normal operation, the initial copying routine and the failover routine can be executed using the same operations as those performed in the first embodiment. Therefore, these operations will not be described again. However, the steps S260 and S270 of the failover routine shown in FIG. 6 can be omitted.

At the same time, during reverse operation in this embodiment, because remote copying is performed using the secondary intermediate storage system 200J as described below, the operations comprising the reverse-operation copying routine and the failback routine are different than in the corresponding routines in the first or second embodiments. Consequently, these different operations used in this embodiment will be described in detail below. In this embodiment as well, as in the second embodiment, the reverse operation copy control routine is not executed.

(C1) Reverse-Operation Copying Routine

Figure 15:
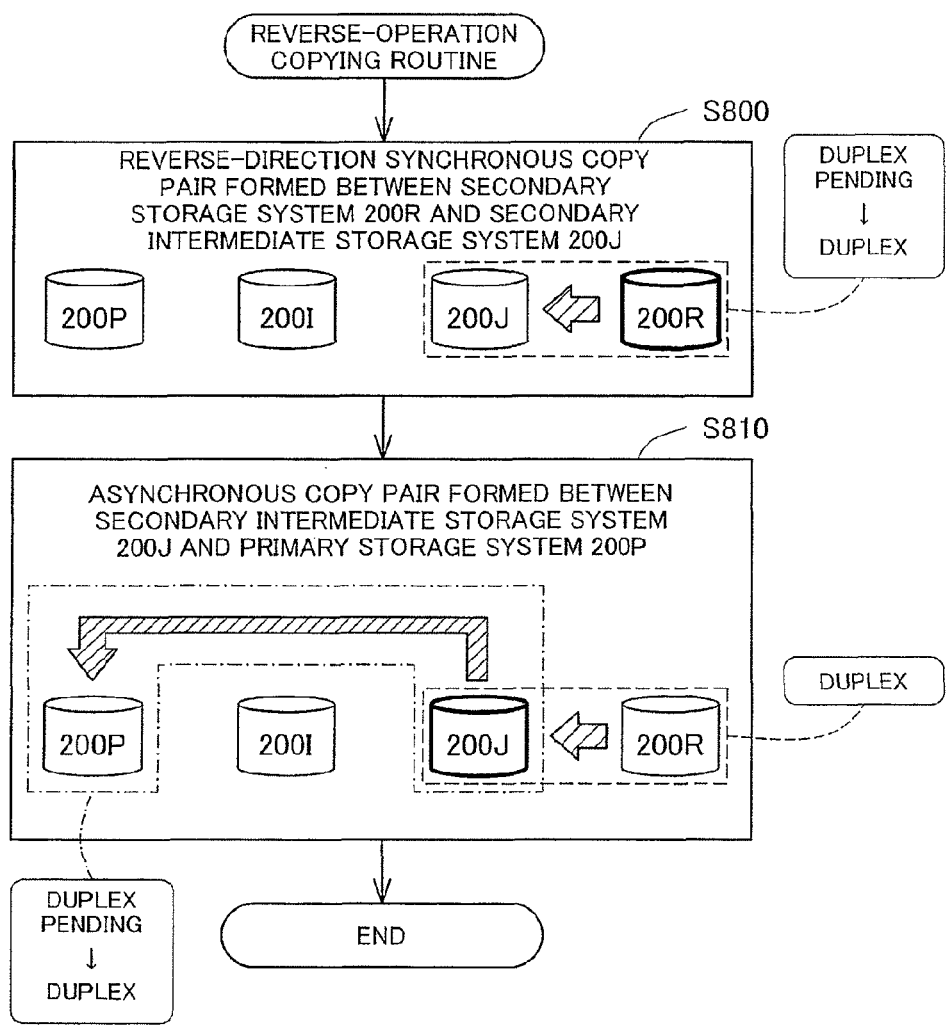
FIG. 15 is a flow chart of a reverse operation copying routine in the third embodiment.

FIG. 15 is a flow chart of the reverse-operation copying routine executed in the third embodiment. This routine is a routine that is executed by the secondary host computer 100R in order to transition the computer system 1000c to the reverse operation state after all failures in all devices have been cleared.

First, the secondary host computer 100R issues an instruction to the secondary storage system 200R to form a synchronous copy pair that carries out reverse-direction synchronous copying from the secondary storage system 200R to the secondary intermediate storage system 200J (step S800). Based on this instruction, a synchronous copy pair is formed by the data volume of the secondary storage system 200R and the data volume of the secondary intermediate storage system 200J, and formation copying is then carried out. During formation copying, the pair state of this synchronous copy pair is 'initial copying underway'. The pair state transitions to 'duplex' when this formation copying is completed.

The secondary host computer 100R then issues an instruction to the secondary intermediate storage system 200J to form an asynchronous copy pair to carry out reverse-direction asynchronous remote copying from the secondary intermediate storage system 200J to the primary storage system 200P (step S810). An asynchronous copy pair is formed by the data volume of the secondary intermediate storage system 200J and the data volume of the primary storage system 200P based on this instruction, and formation copying is carried out between this asynchronous copy pair. The pair state of this asynchronous copy pair is 'initial copying underway' during formation copying, and becomes 'duplex' when formation copying is completed. When the pair state of the asynchronous copy pair becomes 'duplex', the secondary host computer 100R ends the reverse-operation copying routine. After this routine is ended, the computer system 1000c can be caused to carry out reverse operation via execution of the work application by the secondary host computer 100R.

Figure 16:
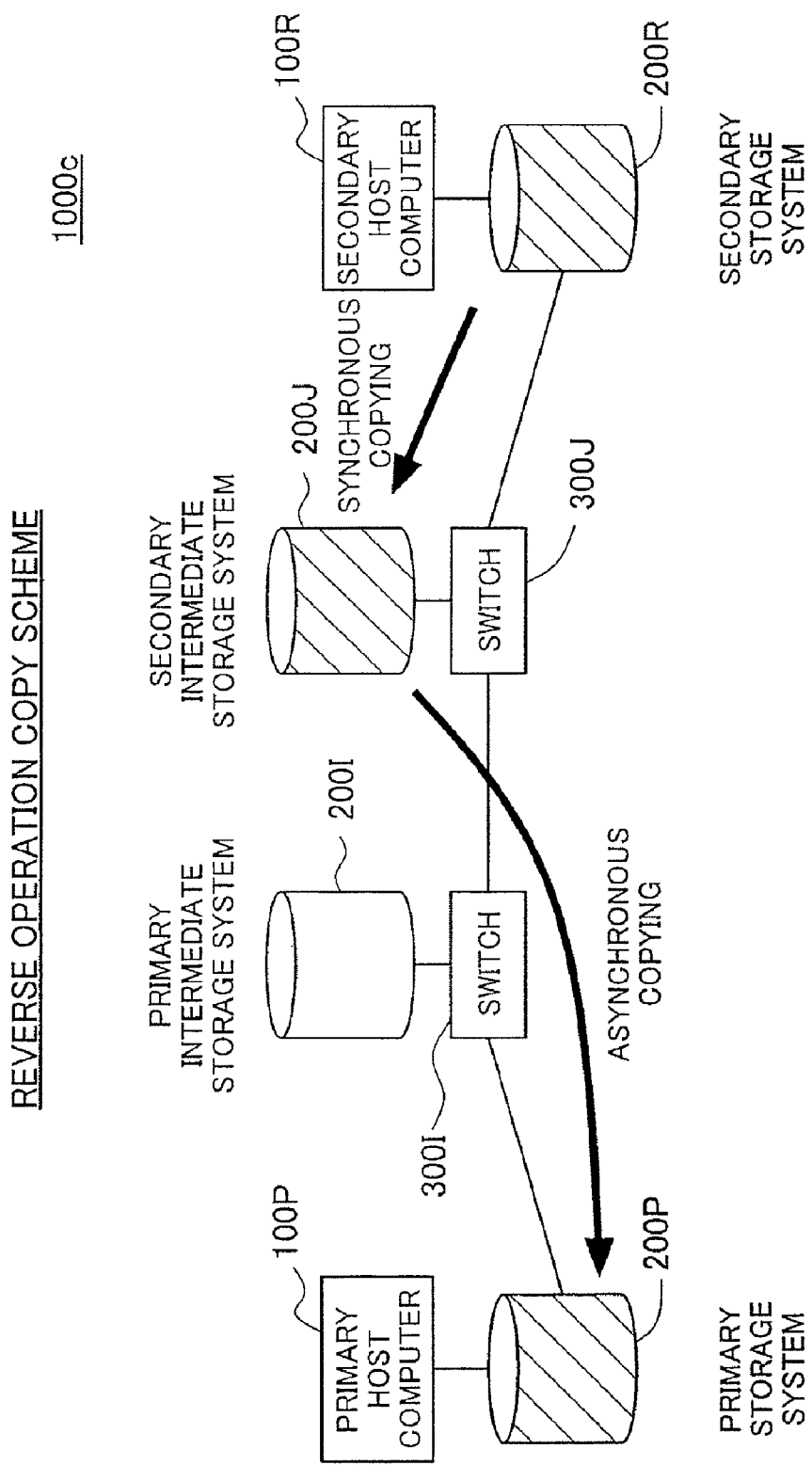
FIG. 16 is an explanatory drawing showing in a schematic fashion the copy scheme employed during reverse operation in the third embodiment.

FIG. 16 is an explanatory drawing showing in a schematic fashion the copy scheme employed during reverse operation in this embodiment. When the secondary host computer 100R takes over work processing from the primary host computer 100P, executes the work application and begins reverse operation, the data in the secondary storage system 200R that is updated by this work application is automatically synchronously copied to the secondary intermediate storage system 200J and then asynchronously copied to the primary storage system 200P, as shown in the drawing. Therefore, even where a failure occurs in the secondary host computer 100R during reverse operation of the computer system 1000c, because the most recent data is saved in the secondary intermediate storage system 200J at all times, the occurrence of data loss can be minimized.

(C2) Failback Routine

Figure 17:
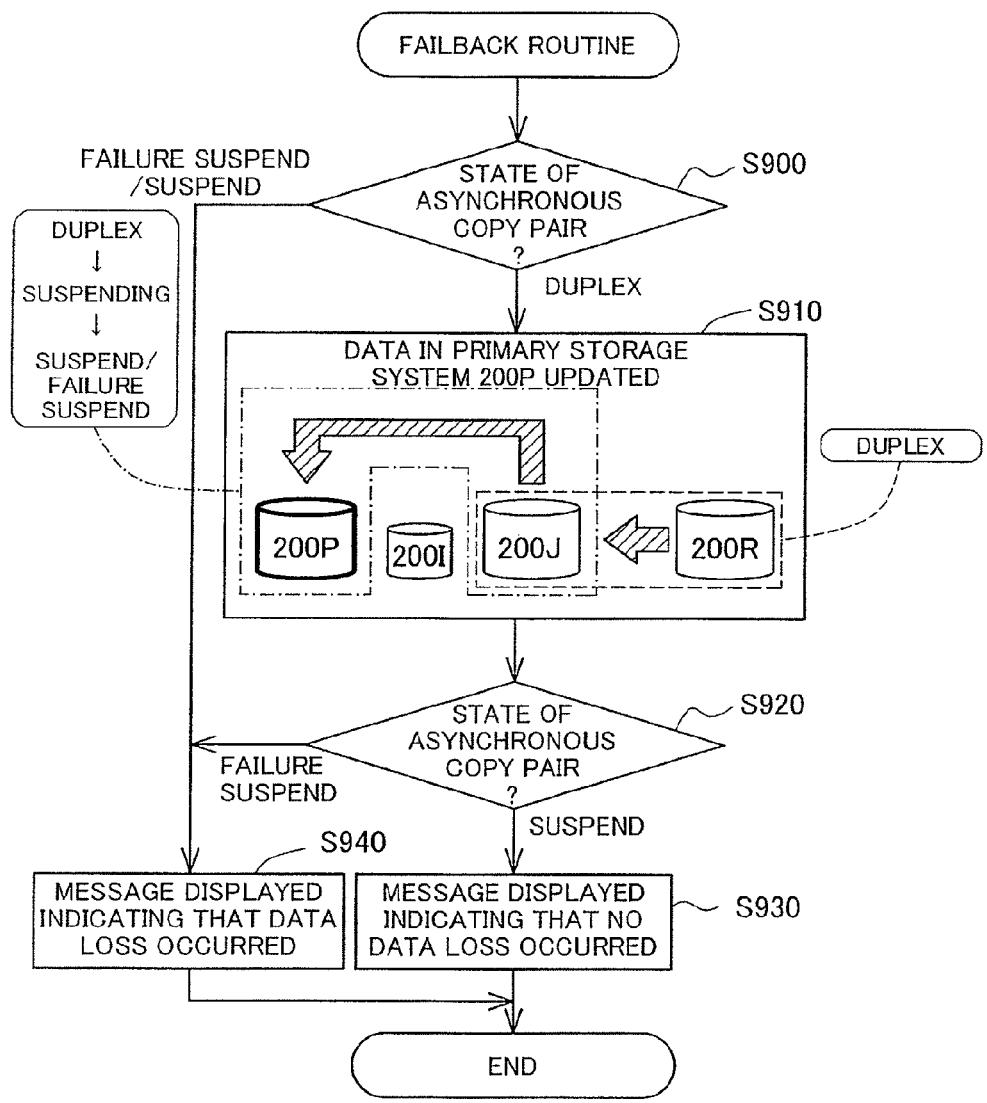
FIG. 17 is a flow chart of a failback routine in the third embodiment.

FIG. 17 is a flow chart of the failback routine of this embodiment. This routine is executed by the primary host computer 100P after the work application being executed by the secondary host computer 100R is stopped, and constitutes a routine to update the data stored in the primary storage system 200P to the most recent data when the computer system 1000c operating in the reverse operation state returns to the normal operation state.

First, the primary host computer 100P requests from the primary storage system 200P state information regarding the asynchronous copy pair that was formed by the primary storage system 200P and the secondary intermediate storage system 200J during the reverse operation initial copying routine described above (step S900). If the response to this inquiry is that the these storage systems are communicating normally, i.e., are in the 'duplex' state, the primary host computer 100P issues an instruction to the primary storage system 200P to retrieve all log information stored in the secondary intermediate storage system 200J (step S910). Based on this instruction, the primary storage system 200P and the secondary intermediate storage system 200J set the pair state of the asynchronous copy pair to 'suspending', and the data stored in the secondary intermediate storage system 200J is copied therefrom to the primary storage system 200P. If this data copy operation is completed normally, the pair state of the asynchronous copy pair formed by these storage devices transitions to 'suspend'. On the other hand, if this data copy fails, the pair state of the asynchronous copy pair becomes 'failure suspend'.

The primary host computer 100P then asks the primary storage system 200P once more for the state information regarding the asynchronous copy pair (step S920). If the resulting pair state is 'suspend', because it can be determined that the data in the primary storage system 200P has been updated normally, the primary host computer 100P displays on the display device 130R a message indicating that data loss did not occur, i.e., that no data loss occurred (step S930), whereupon the failback routine is ended.

Where the result of the inquiry in the above step S900 is either 'suspend' or 'failure suspend', i.e., if the result is anything other than 'duplex', failback based on no data loss is aborted in principle. Consequently, the primary host computer 100P displays on the display device 130P a message indicating that data loss occurred (step S970) and ends the failback routine. Where the result in the above step S920 is 'failure suspend' as well, failback based on no data loss is aborted, a message indicating that data loss occurred is displayed on the display device 130P, and the failback routine is ended.

However, where the inquiry of the above step S900 returns a response of 'suspend', rather than display of a message indicating that data loss occurred, failback based on no data loss can be executed by adding the following operation between the above steps S900 and S910. In this operation, if it is determined that the response to the pair state inquiry is 'suspend', the primary host computer 100P issues an instruction to re-synchronize the asynchronous copy pair formed by the data volume of the secondary intermediate storage system 200J and the data volume of the primary storage system 200P. Based on this instruction, the secondary intermediate storage system 200J and the primary storage system 200P are re-synchronized via formation copying. As a result, the pair state of the asynchronous copy pair transitions from the 'suspend' state to the 'duplex' state via the 'duplex pending' state. When the pair state of the asynchronous copy pair becomes 'duplex' in this fashion, failback based on no data loss can thereafter be performed by executing the processes beginning with step S910.

If the above failback routine of this embodiment is completed normally, the most recent data stored in the secondary intermediate storage system 200J is copied to the primary storage system 200P. Consequently, the computer system 1000c can be transitioned to the normal operation state when the initial copying routine described in connection with the first embodiment is executed by the primary host computer 100P.

According to the computer system 1000c of the third embodiment having the above construction, data can be copied during reverse operation as well via synchronous copying from the secondary storage system 200R to the secondary intermediate storage system 200J. Therefore, the risk of data loss can be reduced even where a failure occurs in the secondary host computer 100R during reverse operation.

(C3) Variation of Third Embodiment

Figure 18:
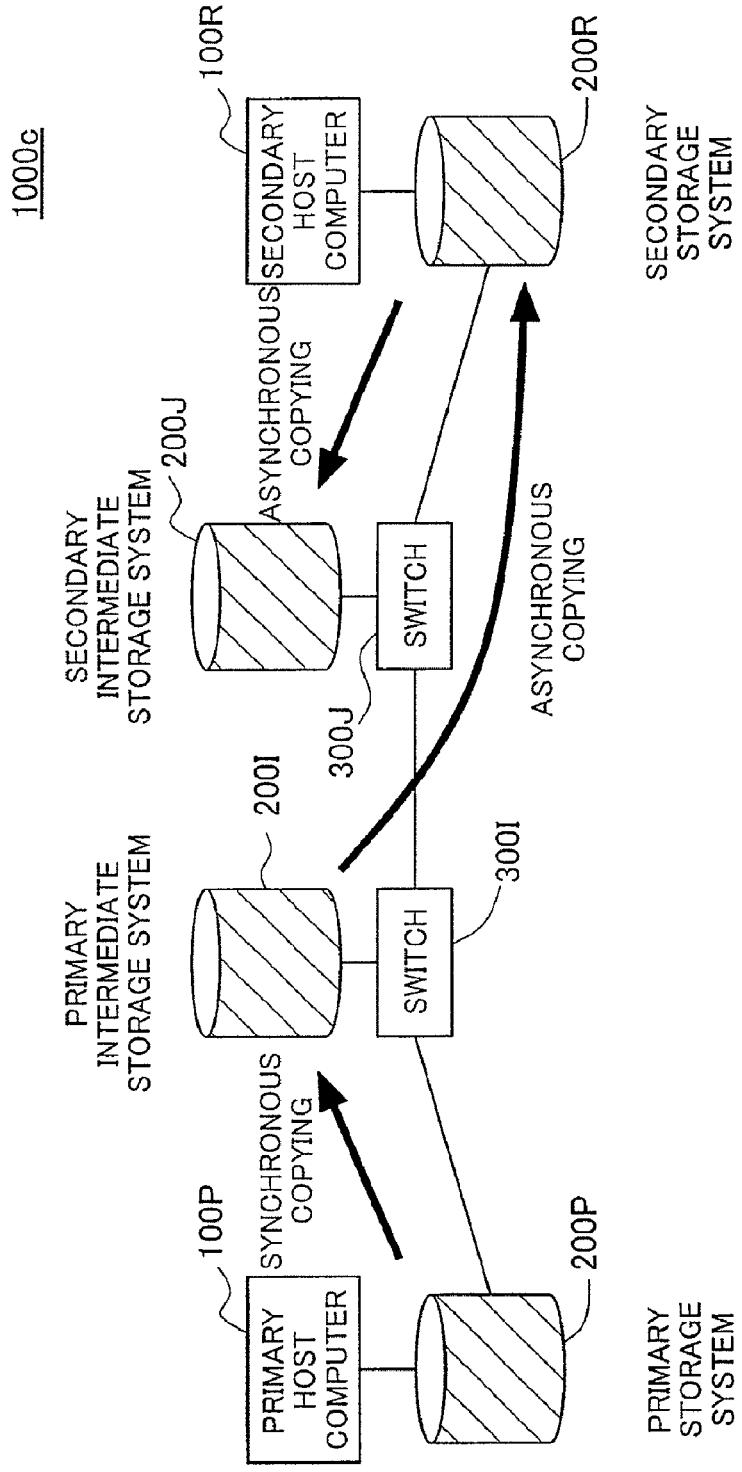
FIG. 18 is an explanatory drawing showing the basic construction of a computer system 1000c comprising a variation of the third embodiment.

FIG. 18 is an explanatory drawing showing the basic construction of a computer system 1000c comprising a variation of the third embodiment. In the computer system 1000c of this variation, the data that reaches the secondary storage system 200R from the primary storage system 200P via the primary intermediate storage system 200I during normal operation is further copied to the secondary intermediate storage system 200J via asynchronous remote copying. In order to reduce the processing burden, synchronous copying from the secondary storage system 200R to the secondary intermediate storage system 200J is not carried out. In other words, if synchronous copying were performed, the remote copying sequence would be asynchronous copying (200I→200R), synchronous copying (200R→200J), and in the case of this copy scheme, the primary host computer 100P or secondary host computer 100R would be required to execute the same resident program that is executed during the reverse operation copy control routine described in connection with the first embodiment. Accordingly, synchronous copying is not performed in order to omit this processing and thereby reduce the processing burden.

According to the variation having the above construction, because data is copied sequentially from the secondary storage system 200R to the secondary intermediate storage system 200J, data can be quickly copied from the secondary intermediate storage system 200J to the primary storage system 200P when reverse operation is begun. Incidentally, this construction may be used not only during normal operation, but may be used during reverse operation as well by executing asynchronous copying from the primary storage system 200P to the primary intermediate storage system 200I.

D. Fourth Embodiment

Figure 19:
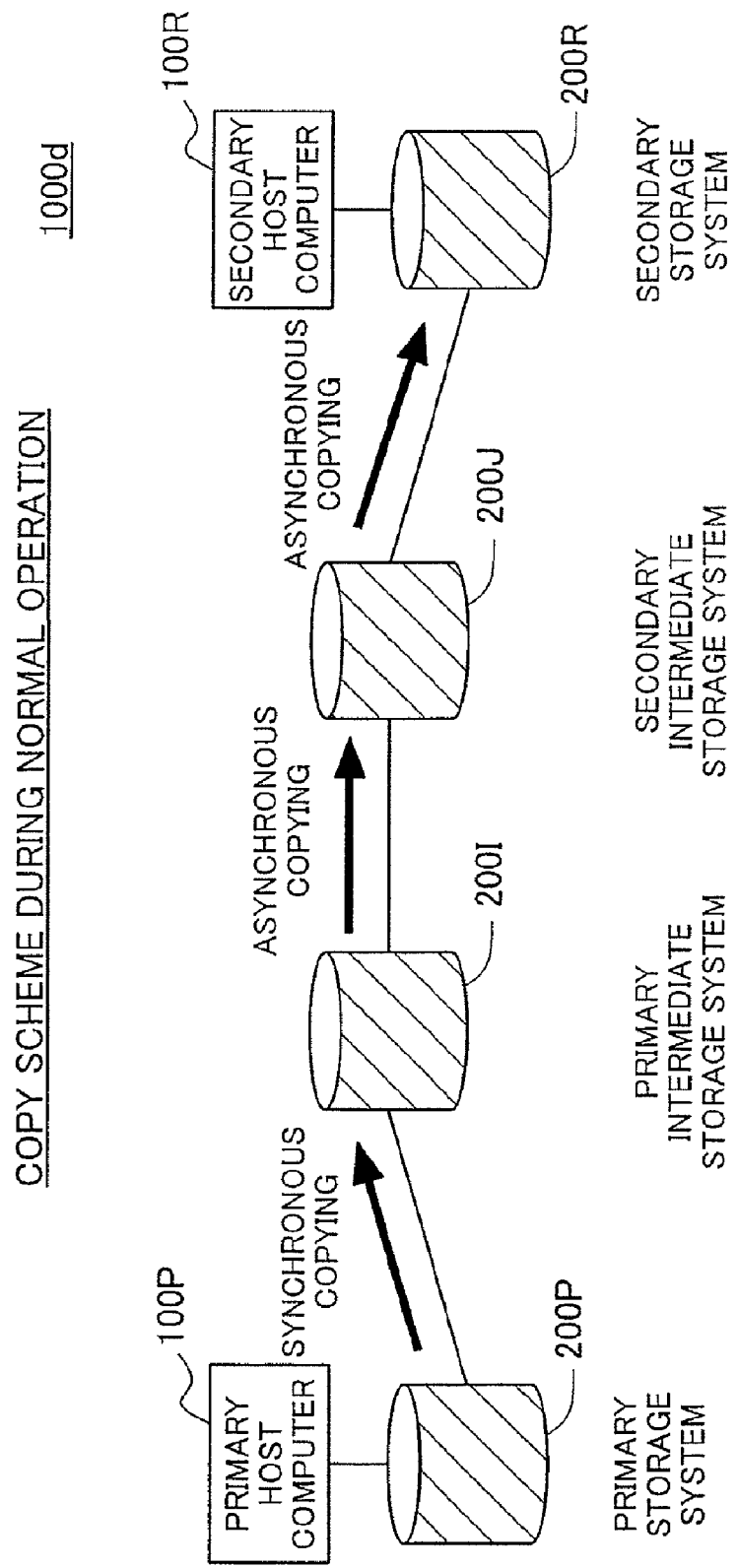
FIG. 19 is a explanatory drawing that shows the construction of a computer system 1000d comprising a fourth embodiment, as well as shows in a schematic fashion the copy scheme used therein during normal operation.

FIG. 19 is an explanatory drawing showing in a schematic fashion the construction of a computer system 1000d comprising a fourth embodiment and the copy scheme employed during normal operation therein. The computer system 1000d of this embodiment includes two intermediate storage systems as in the third embodiment, such that it comprises a total of four storage systems connected serially.

During normal operation of the computer system 1000d of this embodiment, the primary host computer 100P forms a forward-direction synchronous copy pair between the primary storage system 200P and the primary intermediate storage system 200I, a forward-direction asynchronous copy pair between the primary intermediate storage system 200I and the secondary intermediate storage system 200J, and a forward-direction asynchronous copy pair between the secondary intermediate storage system 200J and the secondary storage system 200R.

In this construction, when the data in the primary storage system 200P is updated by the work application being executed by the primary host computer 100P, the data in the primary intermediate storage system 200I is simultaneously updated via synchronous copying. Log information is then copied from the primary intermediate storage system 200I to the secondary intermediate storage system 200J via asynchronous copying. This log information is also copied to the secondary storage system 200R, and the data stored in the secondary storage system 200R is updated based on this log information.

(D1) Failover Routine

Figure 20:
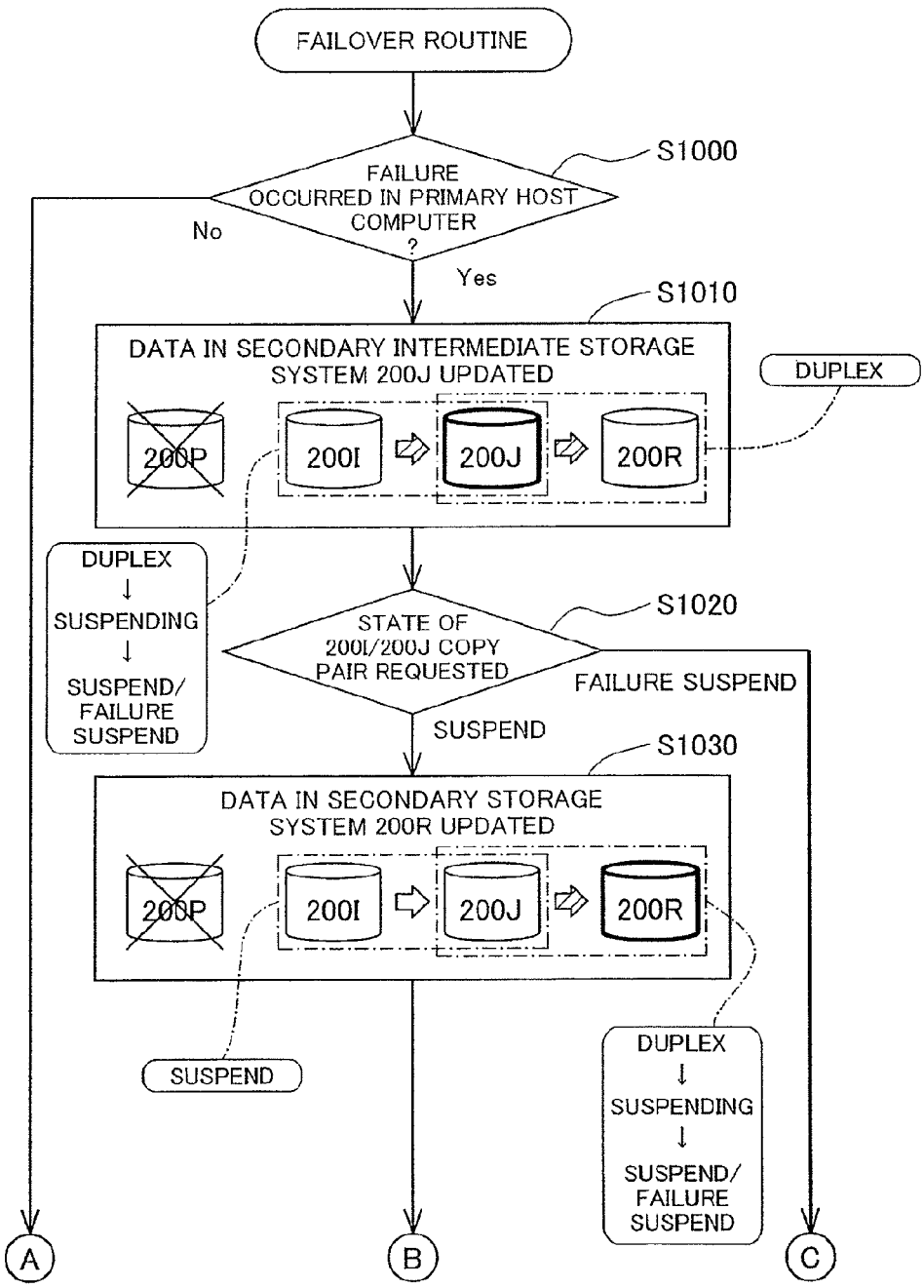
FIG. 20 is a flow chart of a failover routine in the fourth embodiment.
Figure 21:
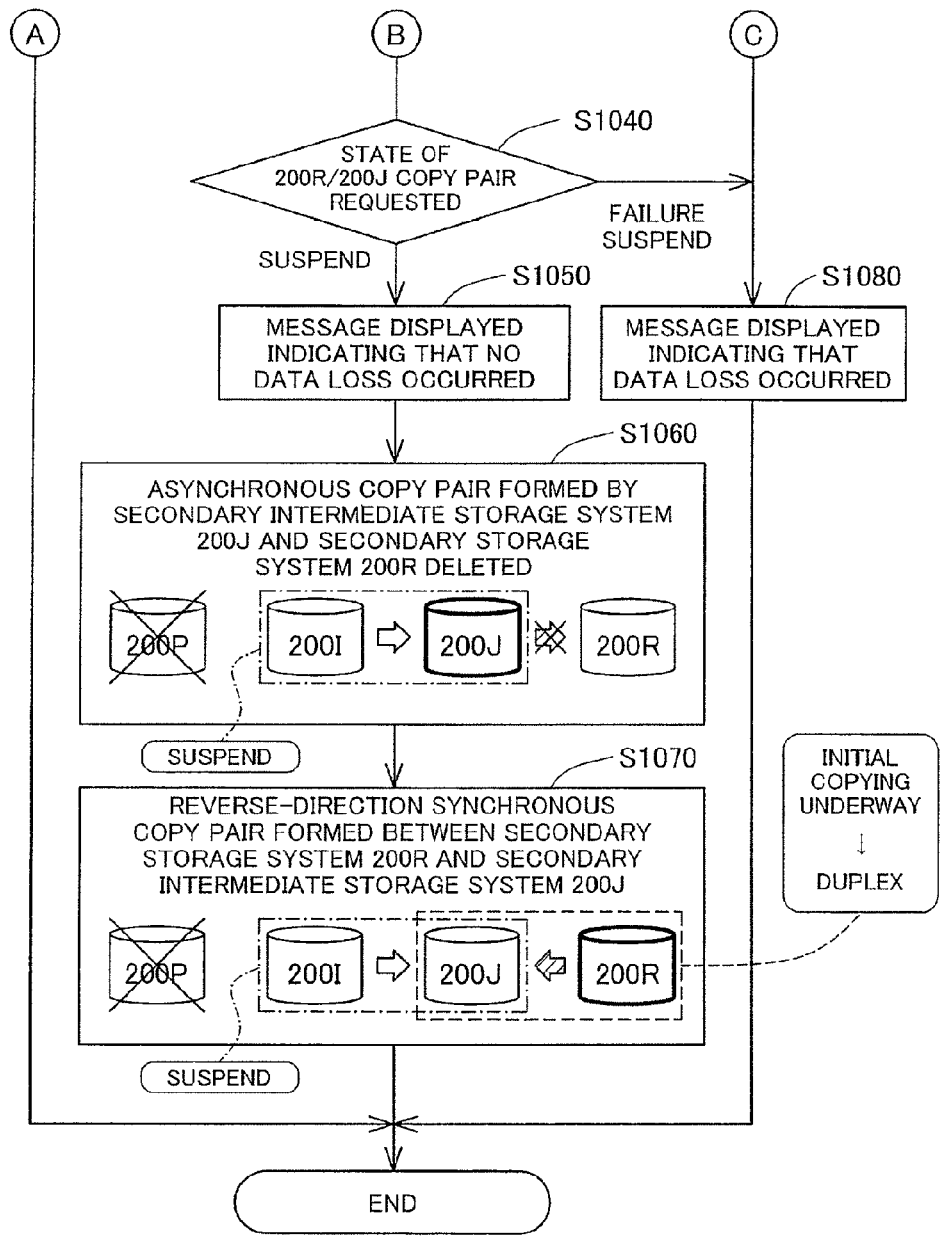
FIG. 21 is a flow chart of a failover routine in the fourth embodiment.

FIGS. 20 and 21 are flow charts showing a failover routine executed in the fourth embodiment. This failover routine is a routine that is executed by the secondary host computer 100R when a failure occurs in the primary host computer 100P and/or the primary storage system 200P.

First, when it is detected that a failure has occurred in the primary host computer 100P or the primary storage system 200P (step S1000), the secondary host computer 100R issues an instruction to the secondary intermediate storage system 200J to retrieve all log information from the primary intermediate storage system 200I and update the data (step S1010). The pair state of this asynchronous copy pair during data updating becomes 'suspending'. If data updating is completed normally, the pair state then transitions to 'suspend', while if data updating fails, the pair state transitions to 'failure suspend'.

The secondary host computer 100R then requests state information regarding the asynchronous copy pair formed by the primary intermediate storage system 200I and the secondary intermediate storage system 200J (step S1020), and if the response to this inquiry is 'suspend', the secondary host computer 100R issues an instruction to the secondary storage system 200R to retrieve all log information from the secondary intermediate storage system 200J and update the data (step S1030). The pair state of this asynchronous copy pair becomes 'suspending' during data updating. If data updating is completed normally, the pair state then transitions to 'suspend', while if data updating fails, the pair state transitions to 'failure suspend'.

Referring now to FIG. 21, the secondary host computer 100R then requests state information regarding the asynchronous copy pair formed by the secondary storage system 200R and the secondary intermediate storage system 200J (step S1040), and if the response to this inquiry is 'suspend', the secondary host computer 100R displays on the display device 130R a message indicating that no data loss occurred (step S1050). The secondary host computer 100R then deletes the asynchronous copy pair formed by the secondary intermediate storage system 200J and the secondary storage system 200R (step S1060). The secondary host computer 100R then forms a reverse-direction synchronous copy pair between the secondary storage system 200R and the secondary intermediate storage system 200J via formation copying (step S1070), whereupon the failover routine is ended. The pair state for this synchronous copy pair becomes 'initial copying underway' during formation copying, and becomes 'duplex' after formation copying is completed.

If the response to the pair state inquiry in the above step S1020 or step S1040 is 'failure suspend', failover based on no data loss is aborted, a message indicating the occurrence of data loss is displayed on the display device 130R (step S1080), and the failover routine is ended.

After the failover routine described above ends, the work application can be rebooted using the secondary host computer 100R. Because a synchronous copy pair is formed by the secondary storage system 200R and the secondary intermediate storage system 200J, when the secondary host computer 100R runs the work application using the data in the secondary storage system 200R, data identical to this data is backed up in the secondary intermediate storage system 200J. However, where this backup is not to be performed, the operations of steps S1060 and S1070 described above may be omitted.

In the above step S1070, when the secondary storage system 200R that received the asynchronous copy pair creation instruction from the secondary host computer 100R and the secondary intermediate storage system 200J writes the information that defines the synchronous copy pair into the definition information in memory, the pair state of the synchronous copy pair can be transitioned to 'duplex' without the need for formation copying because the data stored in the secondary storage system 200R and the data in the secondary intermediate storage system 200J are synchronized through the operations of steps S1010 and S1030 described above.

In addition, while in principle the work application is rebooted by the secondary host computer 100R after the failover routine described above is ended, it may instead be rebooted after the display of no data loss in the above step S1050 but before the formation of the synchronous copy pair in the above step S1070. In this case, formation copying from the secondary storage system 200R to the secondary intermediate storage system 200J must be carried out when the synchronous copy pair is formed in the above step S1070, because data may have already been written from the secondary host computer 100R to the secondary storage system 200R and the data stored in these storage devices may not have been synchronized.

(D2) Reverse-Operation Copying Routine

Figure 22:
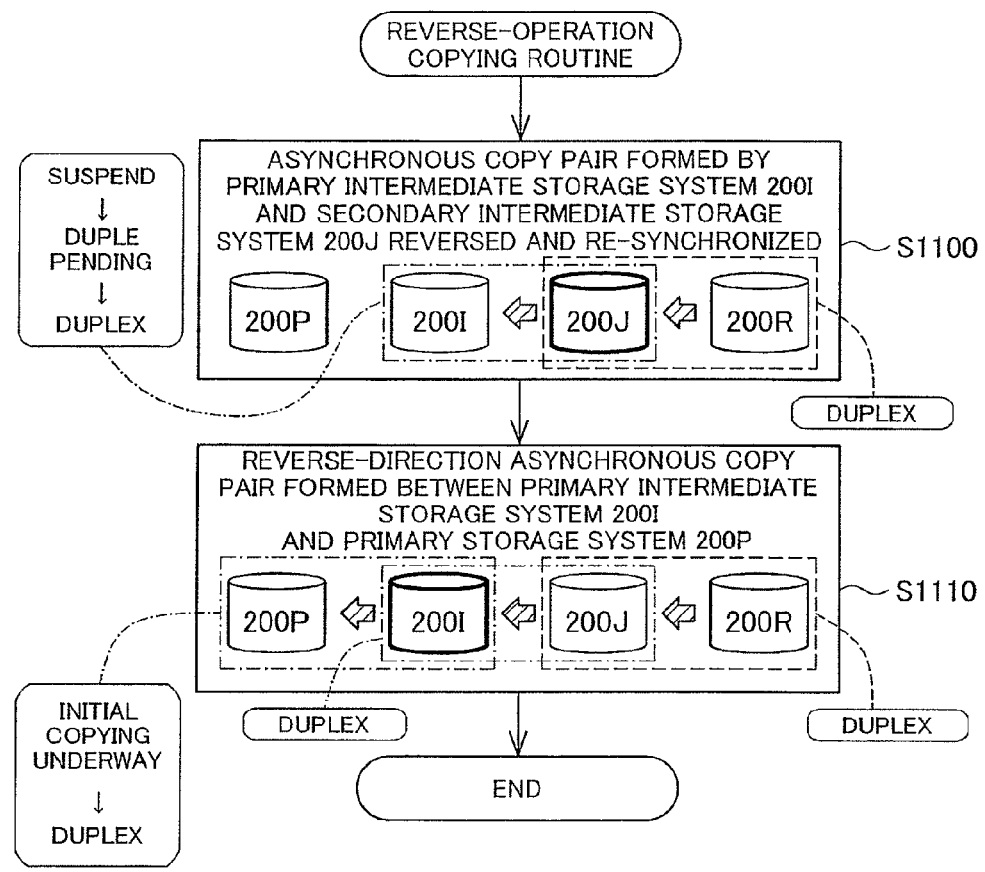
FIG. 22 is a flow chart of a reverse copying routine in the fourth embodiment.

FIG. 22 is a flow chart of the reverse-operation copying routine of the fourth embodiment. This routine is a routine to transition the computer system 1000d to the reverse operation state when a failure in the primary host computer 100P or the primary storage system 200P has been cleared.

First, the secondary host computer 100R issues an instruction to the secondary intermediate storage system 200J to reverse the copy direction of the asynchronous copy pair formed by the primary intermediate storage system 200I and the secondary intermediate storage system 200J that were set to the suspend state in step S1010 of the failover routine described above, and to then re-synchronize the data therebetween via formation copying (step S1100). When this occurs, the pair state becomes 'duplex pending' immediately after the change in copy direction, and transitions to 'duplex' after formation copying is completed.

The secondary host computer 100R then issues an instruction to the primary intermediate storage system 200I to form an asynchronous copy pair to carry out reverse-direction asynchronous copying between the primary intermediate storage system 200I and the primary storage system 200P, and then causes it to execute formation copying (step S1110). When this occurs, the pair state becomes 'initial copying underway' during formation copying, and then transitions to 'duplex' after formation copying is completed. With this operation, the reverse-operation copying routine ends.

Figure 23:
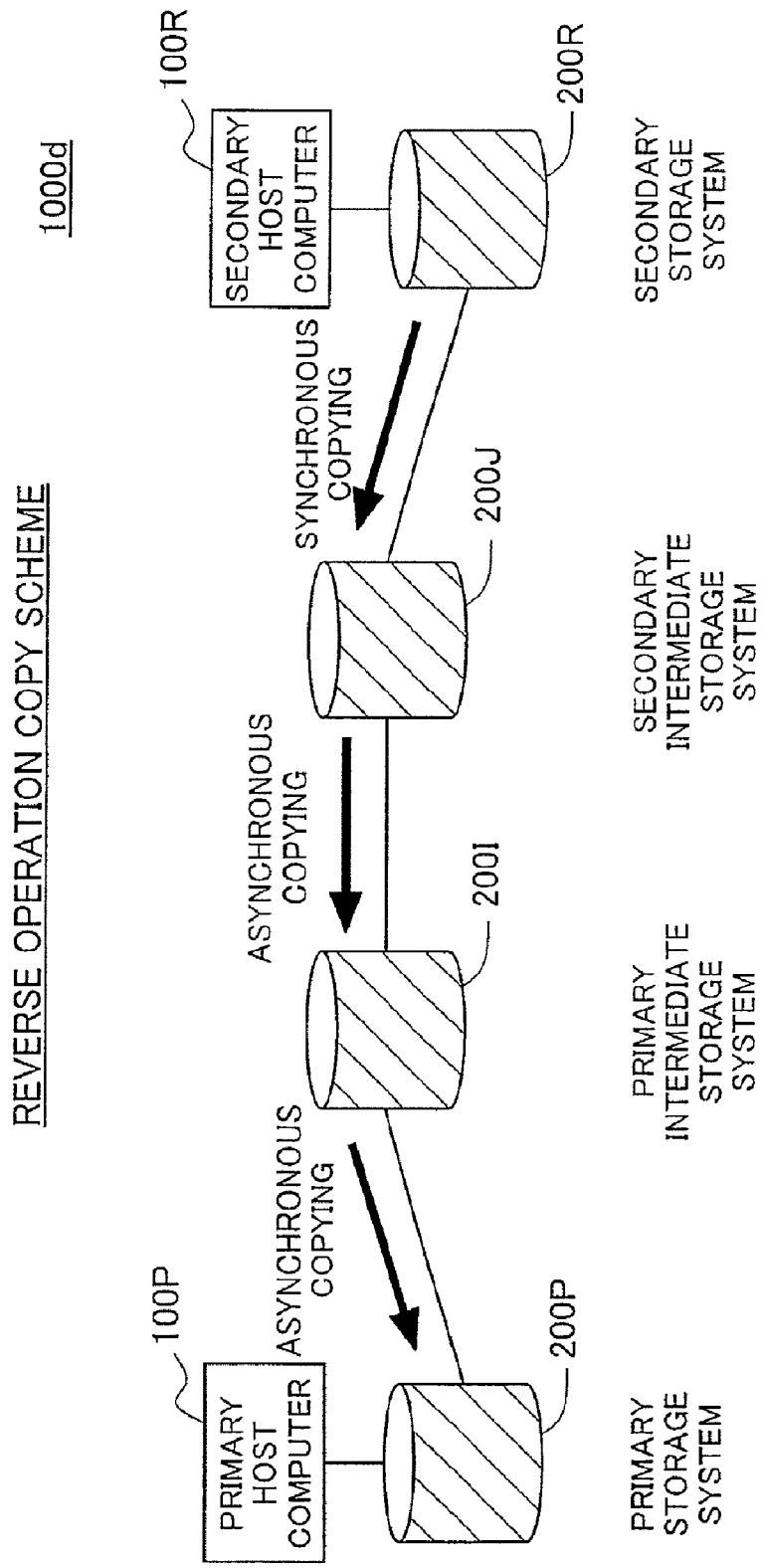
FIG. 23 is an explanatory drawing showing in a schematic fashion the copy scheme employed during reverse operation in the fourth embodiment.

FIG. 23 is an explanatory drawing showing in a schematic fashion the copy scheme employed during reverse operation in this embodiment. By having the second host computer 100R reboot the work application after the reverse-operation copying routine described above is ended, reverse operation is commenced using the copy scheme shown in the drawing. As can be determined from a comparison with the copy scheme shown in FIG. 19, in this embodiment, reverse operation is carried out in exactly the opposite copy direction relative to normal operation.

(D3) Failback Routine

Figure 24:
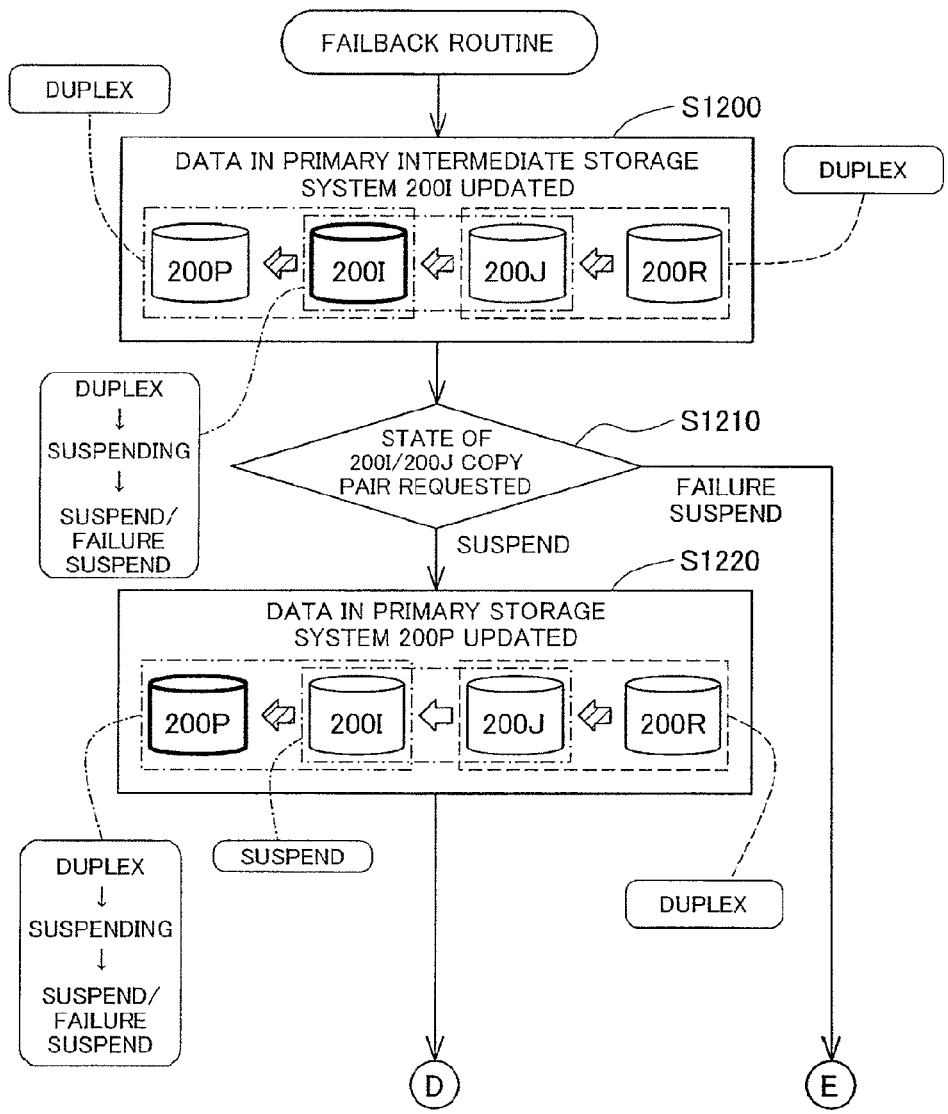
FIG. 24 is a flow chart of a failback routine in the fourth embodiment.
Figure 25:
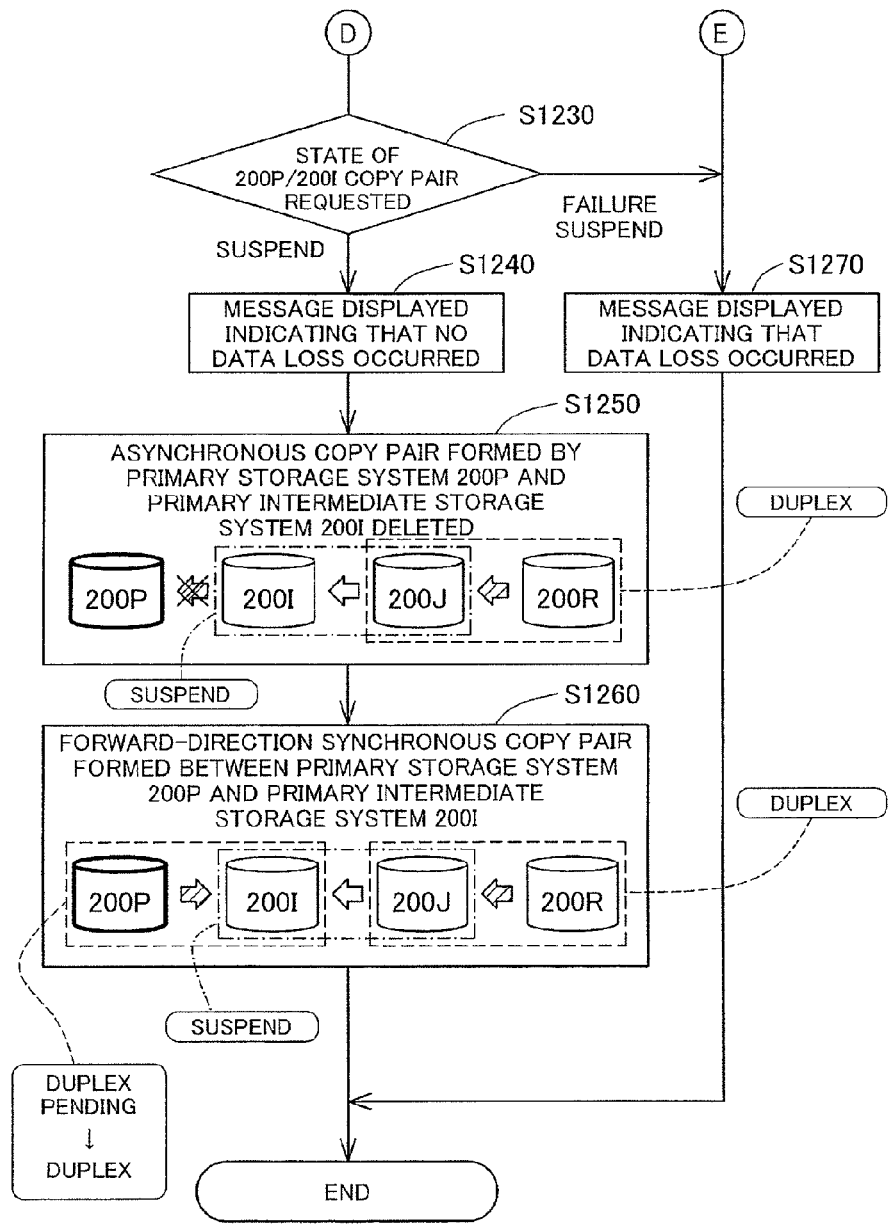
FIG. 25 is a flow chart of a failback routine in the fourth embodiment.

FIGS. 24 and 25 are flow charts of the failback copying routine in the fourth embodiment. This routine is a routine to update the data stored in the primary storage system 200P to the most recent data when the computer system 1000d returns from the reverse operation state to the normal operation state.

First, after the secondary host computer 100R stops the work application, the primary host computer 100P issues an instruction to the primary intermediate storage system 200I to retrieve all log information from the secondary intermediate storage system 200J and update the data (step S1200). The pair state of this asynchronous copy pair becomes 'suspending' during this data updating. If data updating has been performed normally, the pair state thereafter transitions to 'suspend', but if data updating has not been performed normally, the pair state transitions to 'failure suspend'.

The primary host computer 100P then requests state information regarding the asynchronous copy pair formed by the primary intermediate storage system 200I and the secondary intermediate storage system 200J (step S1210), and if the response to this inquiry is 'suspend', it issues an instruction to the primary storage system 200P to retrieve all log information from the primary intermediate storage system 200I and update the data (step S1220). During data updating, the pair state of the asynchronous copy pair formed by the primary storage system 200P and the primary intermediate storage system 200I becomes 'suspending'. If data updating has been performed normally, the pair state thereafter transitions to 'suspend', but if data updating has not been performed normally, the pair state transitions to 'failure suspend'.

Referring now to FIG. 25, the primary host computer 100P then requests state information regarding the asynchronous copy pair formed by the primary storage system 200P and the primary intermediate storage system 200I (step S1230), and if the response to this inquiry is 'suspend', the primary host computer 100P displays on the display device 130R a message indicating that no data loss occurred (step S1240). The primary host computer 100P then deletes the asynchronous copy pair formed by the primary intermediate storage system 200I and the primary storage system 200P (step S1250). A forward-direction synchronous copy pair is then formed between the primary storage system 200P and the secondary intermediate storage system 200I via formation copying (step S1260), whereupon the failback routine is ended. The pair state of this synchronous copy pair becomes 'initial copying underway' during formation copying, and becomes 'duplex' after formation copying is completed. Where data backup is not to be performed using the primary intermediate storage system 200I during normal operation after the failback routine is completed, the operations of steps S1250 and S1260 may be omitted.

Where the response to the inquiry in the above steps S1210 or S1230 is 'failure suspend', failback based on no data loss is aborted, and a message indicating the occurrence of data loss is displayed on the display device 130R (step S1270), whereupon the failback routine is ended.

Once the failback routine described above is completed, the primary host computer 100P can reboot the work application. If asynchronous copy pairs are thereafter formed between the primary intermediate storage system 200I and secondary intermediate storage system 200J and between the secondary intermediate storage system 200J and secondary storage system 200R, the computer system 1000d can be transitioned to the normal operation state shown in FIG. 17.

According to the computer system 1000d of the fourth embodiment having the above construction, because the copy scheme that copies the data is identical in the normal operation state and in the reverse operation state, the copy control program executed by the primary host computer 100P and the secondary host computer 100R can be simplified and shared.

Several embodiments of the present invention were described above. As shown with reference to these embodiments, according to this invention, in a computer system in which three or four storage devices are installed at different locations and connected serially, practical remote copying can be carried out during both normal operation and reverse operation, and even in the event of a failure.

The present invention is not limited to the embodiments described above, and may naturally be implemented in various forms within the essential scope thereof. For example, in the various embodiments described above, asynchronous remote copying was carried out based on log information stored in a journal volume, but it is acceptable if asynchronous remote copying is carried out using the method described below in which a difference volume is included in each storage device rather than a journal volume.

The copy source storage device obtains a difference snapshot of the data stored in the data volume at prescribed time intervals, and stores the data snapshot in its difference volume. 'Difference snapshot' as used here refers to data comprising the update information incorporated via write processing to the data volume during the period from the time at which the previous difference snapshot was obtained to the current point in time.

When data snapshot storage is completed, the copy source storage device sends the difference data in the difference volume to the copy destination storage device. When this is taking place, even if writing from the host computer is performed, because this writing is carried out to the data volume, the contents of the difference volume are not changed until the copy of the difference data to the copy destination storage device is completed.

The copy destination storage device that receives the difference data in the copy source storage device's difference volume stores the difference data in its own difference volume. When the copy of the difference data from the copy source storage device to the copy destination storage device is completed, the copy source storage device reflects the data stored in the difference volume in its own data volume.

When this reflection operation is completed, the copy destination storage device notifies the copy source storage device of this fact, whereupon the copy source storage device becomes enabled to obtain a difference snapshot once again. Asynchronous remote copying can be carried out by repeating the above operations.

In the above embodiments, synchronous remote coping and asynchronous remote coping are realized by the operations of the CPU 210P and the CPU 210I respectively. A synchronous copy device is also used for synchronous remote coping as a substitute for the CPU 210P and the memory 220P. In the same manner, an asynchronous copy device is used for asynchronous remote coping as a substitute for the CPU 210I and the memory 220I.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A computer system storing data on multiple storage systems, said computer system comprising:
a primary storage system that is coupled to a first computer that executes prescribed work processing and stores data used when the first computer is executing said work processing;
a secondary storage system that is coupled to a second computer that executes said work processing in place of said first computer and stores data used when said second computer is executing said work processing;
a primary intermediate storage system that is coupled to said primary storage system;
a secondary intermediate storage system that is coupled to said secondary storage system and said primary intermediate storage system;
wherein said computer system has a first remote copy status and a second remote copy status;
wherein, in said first remote copy status, said first computer processes a first copy and a second copy, said first copy includes that said primary storage system copies the data stored therein to said primary intermediate storage system via synchronous copying for storage therein, said second copy includes that said primary intermediate storage system copies the copied data to said secondary storage system through said secondary intermediate storage system via asynchronous copying for storage therein;
wherein, in said second remote copy status, said second computer processes a third copy and a fourth copy, said third copy includes that said secondary storage system copies the data stored therein to said secondary intermediate storage system via asynchronous copying for storage therein, said fourth copy includes that said secondary intermediate storage system copies the copied data to said primary storage system through said primary intermediate storage system via synchronous copying for storage therein, and
wherein, in said second remote copy status, a status of said fourth copy is suspend after a status said third copy is duplex.

2. A computer system storing data on multiple storage systems, said computer system comprising:
a primary storage system that is coupled to a first computer that executes prescribed work processing and stores data used when the first computer is executing said work processing;
a secondary storage system that is coupled to a second computer that executes said work processing in place of said first computer and stores data used when said second computer is executing said work processing;
a primary intermediate storage system that is coupled to said primary storage system;
a secondary intermediate storage system that is coupled to said secondary storage system and said primary intermediate storage system;
wherein said first computer processes a first copy, a second copy, and a third copy, said first copy includes that said primary storage system copies the data stored therein to said primary intermediate storage system via synchronous copying for storage therein, said second copy includes that said primary intermediate storage system copies the copied data to said secondary intermediate storage system via asynchronous copying for storage therein, said third copy includes that said secondary intermediate storage system copies the copied data to said secondary storage system via asynchronous copying for storage therein;
wherein, if a failure occurs in said first computer or in said primary storage system, then said second computer confirms a status of said second copy,
if said status of said second copy is suspend, then said second computer confirms a status of said third copy, and
if said status of said third copy is suspend, then said second computer deletes remote copy pair formed between said secondary intermediate storage system and said secondary storage system.

3. The computer system according to claim 1, further including copying log information stored in the primary intermediate storage system to the secondary intermediate storage system.

4. The computer system according to claim 3, further including determining if the copying log information was completed without data loss.

5. The computer system according to claim 1, further including copying log information stored in the secondary intermediate storage system to the primary storage system.

6. The computer system according to claim 5, further including determining if the copying log information was completed without data loss.

7. The computer system according to claim 1, wherein a distance between the primary storage system and the primary intermediary storage system is less than a distance between the primary intermediary storage system and the secondary storage system.

8. The computer system according to claim 1, wherein a distance between the secondary storage system and the secondary intermediary storage system is less than a distance between the secondary intermediary storage system and the primary storage system.

9. The computer system according to claim 1, wherein said computer system further has a back-up mode wherein said second computer causes said secondary storage system to copy data stored therein to said secondary intermediate storage system via asynchronous copying for storage therein and wherein said first computer causes data stored in said primary storage system to be copied to said secondary storage system through said primary intermediate storage system.

10. The computer system of claim 1, wherein said third copy operation includes copying the data stored in said secondary storage system into said intermediate storage system and then copying data stored in said intermediate storage system to said primary storage system via asynchronous copying.

11. The computer system of claim 10, wherein said second computer stops copying of data from said secondary storage system to said intermediate storage system while copying of data from said intermediate storage system to said primary storage system is occurring, wherein said second computer stops copying of data from said intermediate storage system to said primary storage system while copying of data from said secondary storage system to said intermediate storage system is occurring.

12. A computer system storing data on a multiple storage systems, said computer system comprising:
a primary storage system that is coupled to a first computer that executes prescribed work processing and stores data used when the first computer is executing said work processing;
a secondary storage system that is coupled to a second computer that executes said work processing in place of said first computer and stores data used when said second computer is executing said work processing;
an intermediate storage system that is coupled to said primary and secondary storage systems;
wherein said computer system has a first remote copy status and a second remote copy status;
wherein, in said first remote copy status, said first computer processes a first copy operation and a second copy operation, said first copy operation includes that said primary storage system copies the data stored therein into said intermediate storage system via synchronous copying for storage therein, said second copy operation includes that said intermediate storage system copies the copied data to said secondary storage system via asynchronous copying for storage therein;
wherein, in said second remote copy status, said second computer processes a third copy operation, said third copy operation includes that said secondary storage system copies the data stored therein into said primary storage system via asynchronous copying for storage therein, and wherein, in said second remote copy status, a status of said third copy operation is suspend after said status of said third copy operation is duplex,
said intermediate storage system comprises a primary intermediate storage system connected to said primary storage system and a secondary intermediate storage system connected to said secondary storage system;
said first copy operation further includes said primary storage system copying data stored therein into said primary intermediate storage system via synchronous copying, and said primary intermediate storage system copying the copied data to said secondary storage system via asynchronous copying; and
said second copy operation further includes said secondary storage system copying data stored therein into said secondary intermediate storage system via synchronous copying, and said secondary intermediate storage system copying the copied data to said primary storage system via asynchronous copying.

13. The computer system of claim 12, wherein said computer system further has a back-up mode data stored in said secondary storage system is copied to said secondary intermediate storage system via asynchronous copying and wherein data stored in said primary storage system is copied to said secondary storage system through said primary intermediate storage system.

14. The computer system of claim 12, wherein a distance between said primary storage system and said primary intermediary storage system is less than a distance between said primary intermediary storage system and said secondary storage system.

15. The computer system of claim 12, wherein a distance between said secondary storage system and said secondary intermediary storage system is less than a distance between said secondary intermediary storage system and said primary storage system.

16. The computer system of claim 2, wherein said first computer further processes a copy operation of log information from said primary intermediate storage system to said secondary intermediate storage system, and a copy operation of log information copied into said secondary intermediate storage system to said secondary storage system.

17. The computer system of claim 2, wherein when said failure occurs, said second computer further processes a copy operation of log information stored in said primary intermediate storage system to said secondary intermediate storage system.

18. The computer system of claim 2, wherein when said status of said second copy is suspend, then said second computer further processes a copy operation of log information stored in said secondary intermediate storage system to said secondary storage system.

19. The computer system of claim 2, wherein when said status of said third copy is suspend, then said second computer further processes a fourth copy which is an operation wherein data is copied from said secondary storage system to said secondary intermediate storage system via synchronous copying.

* * * * *